(12) United States Patent
Lee et al.

(10) Patent No.: US 12,405,159 B2
(45) Date of Patent: Sep. 2, 2025

(54) DISPLAY DEVICE AND METHOD OF SETTING DRIVING FIRMWARE OF THE SAME

(71) Applicant: SAMSUNG DISPLAY CO., LTD., Yongin-si (KR)

(72) Inventors: Eung Kwan Lee, Yongin-si (KR); Sang Kook Kim, Yongin-si (KR); Tae Joon Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 276 days.

(21) Appl. No.: 18/174,644

(22) Filed: Feb. 26, 2023

(65) Prior Publication Data

US 2024/0011827 A1 Jan. 11, 2024

(30) Foreign Application Priority Data

Jul. 5, 2022 (KR) .................. 10-2022-0082253

(51) Int. Cl.
*G01J 1/34* (2006.01)
*G06F 3/041* (2006.01)
*G09G 3/00* (2006.01)

(52) U.S. Cl.
CPC .............. *G01J 1/34* (2013.01); *G06F 3/0412* (2013.01); *G09G 3/006* (2013.01); *G09G 2320/0247* (2013.01)

(58) Field of Classification Search
CPC .......... G01J 1/34; G06F 3/0412; G09G 3/006; G09G 2320/0247
See application file for complete search history.

(56) References Cited

U.S. PATENT DOCUMENTS

| 2011/0292099 A1* | 12/2011 | Kim ...................... G09G 3/3614 345/99 |
| 2013/0069895 A1* | 3/2013 | Lo ........................ G06F 3/04184 345/173 |
| 2017/0108993 A1* | 4/2017 | Lee ........................ G06F 3/0446 |
| 2020/0105198 A1* | 4/2020 | Park ..................... G09G 3/3258 |

FOREIGN PATENT DOCUMENTS

| KR | 10-2008-0000876 | 1/2008 |
| KR | 10-2020-0038385 | 4/2020 |

* cited by examiner

*Primary Examiner* — Peter D McLoone
(74) *Attorney, Agent, or Firm* — F. CHAU & ASSOCIATES, LLC

(57) ABSTRACT

A display device includes a display panel which includes a display area including a plurality of pixels; a touch sensing unit disposed on a front surface of the display panel; a display driving circuit, configured to drive the pixels of the display area based on display control firmware; and a touch driving circuit configured to drive touch electrodes of the touch sensing unit based on touch driving firmware, and further configured to generate touch coordinate data, wherein the display control firmware and the touch driving firmware are initialized or changed according to a comparison result between a flicker noise detection value of the display area and a reference flicker noise detection value, wherein the flicker noise detection value is determined by measuring a change in luminance over time of a flicker detection pattern displayed in the display area.

20 Claims, 16 Drawing Sheets

REW

FIG. 10

REW

Results

| Item | value |
|---|---|
| Flicker min/max % | 26.01 |
| Flicker min/max dB | -5.85 |
| Flicker RMS % | 5.07 |
| Flicker RMS dB | -12.95 |
| Flicker JEITA % | 0.02 |
| Flicker JEITA dB | -72.41 |
| Flicker VESA % | 0.03 |
| Flicker VESA dB | -69.40 |
| Percentage Flicker(IES) | 14.18 |
| Flicker Index(IES) | 0.017 |
| Det. freq. | 60.25 |
| Average | 1.85 |
| Min | 1.46 |
| Max | 1.94 |
| RMS | 1.85 |
| Sample rate | 2048.00 |
| Sample pitch(ms) | 0.49 |
| Min FFT freq | 0.06 |
| Flicker visibility Freq. | 8.19 |
| Flicker visibility | 0.057 |
| Fusion Flicker Index | 0.4728 |

DISPLAY DEVICE AND METHOD OF SETTING DRIVING FIRMWARE OF THE SAME

CROSS-REFERENCE TO RELATED APPLICATION

This application claims priority under 37 C.F.R. § 119 to Korean Patent Application No. 10-2022-0082253 filed on Jul. 5, 2022 in the Korean Intellectual Property Office, the disclosure of which is hereby incorporated by reference in its entirety.

TECHNICAL FIELD

The present disclosure relates to a display device and a method of setting driving firmware of the same.

Discussion of the Related Art

A display device may be a flat panel display device such as a liquid crystal display device, a field emission display device, or an organic light emitting display device. Many display devices include a backlight unit, which produces white or white-blue light, and individual colors are produced by a filtering effect from pixel elements placed in front of the backlight. Recent developments in display device technology have produced devices which include several light emitting elements. For example, some display devices include light emitting elements on a per pixel basis, in which each pixel of a display panel emits lights by itself, resulting in increased display contrast.

Some display devices further include a touch sensing module for sensing a user's touch. The touch sensing module includes touch electrodes and a touch driving circuit configured to detect a change in capacitance between the touch electrodes. During manufacture of the display devices, the touch sensing modules may be formed integrally into an image display unit of the display device, or may be mounted on a front surface of the image display unit.

SUMMARY

A display device a display panel including a display area including a plurality of pixels; a touch sensing unit disposed on a front surface of the display panel; a display driving circuit, configured to drive the pixels of the display area based on display control firmware; and a touch driving circuit configured to drive touch electrodes of the touch sensing unit based on touch driving firmware, and further configured to generate touch coordinate data, wherein the display control firmware and the touch driving firmware are initialized or changed according to a comparison result between a flicker noise detection value of the display area and a reference flicker noise detection value, wherein the flicker noise detection value is determined by measuring a change in luminance over time of a flicker detection pattern displayed in the display area.

In an embodiment, the display driving circuit generates data voltages according to a display driving frequency set in the display control firmware and supplies the data voltages to data lines of the display area, and further supplies an output signal a gate line, wherein the output signal has a voltage magnitude corresponding to a voltage value of output signals set in the display control firmware.

In an embodiment, the touch driving circuit generates touch driving signals with a voltage magnitude corresponding to a voltage value set in the touch driving firmware, and supplies the touch driving signals to the touch electrodes of the touch sensing unit according to a touch driving frequency set in the touch driving firmware.

In an embodiment, the touch driving circuit groups the touch electrodes into a preset number of groups according to programming of the touch driving firmware, and supplies the touch driving signals to the touch electrodes for each group according to the touch driving frequency.

In an embodiment, the flicker noise detection value is computed from a luminance difference value measured through a photometer, wherein the luminance difference value is measured over time while gradually changing a display driving frequency and voltage values of output signals of the display control firmware and gradually changing a touch driving frequency and voltage values of a touch driving signal of the touch driving firmware through a flicker noise detection device.

In an embodiment, the flicker noise detection value is a luminance difference value measured by the photometer, wherein the photometer measures the flicker detection pattern during a measurement period, the measurement period including the steps of: gradually increasing, decreasing, or changing a magnitude of the display driving frequency in units of one or more frame periods within a preset range, gradually increasing, decreasing, or changing the voltage values of the output signal in units of one or more frame periods, and sequentially writing the changes in display driving frequency and voltage values of the output signal to the display driving circuit.

In an embodiment, the flicker noise detection value is computed from a luminance difference value measured by the photometer while simultaneously changing the magnitude of the display driving frequency and the voltage values of the output signal during a same time, or while alternately changing the magnitude of the display driving frequency and the voltage values of the output signal at different times.

In an embodiment, the flicker noise detection value is a luminance difference value measured by the photometer, wherein the photometer measures the flicker detection pattern during a measurement period, the measurement period including the steps of: gradually increasing, decreasing, or changing a magnitude of the touch driving frequency set in the touch driving firmware in units of one or more frame periods within a preset range, gradually increasing, decreasing, or changing the voltage values of the touch driving signal set in the touch driving firmware in units of one or more frame periods, and sequentially writing changes in touch driving frequency and voltage values of the touch driving signal to the touch driving circuit.

In an embodiment, the flicker noise detection value is computed from a luminance difference value measured by the photometer while simultaneously changing the magnitude of the touch driving frequency and the voltage value of the touch driving signals during a same time, or while alternately changing the magnitude of the touch driving frequency and the voltage value of the touch driving signals at different times.

In an embodiment, the display control firmware and the touch driving firmware include preset values for a magnitude of the display driving frequency, a voltage value of the output signals, a magnitude of the touch driving frequency, and a magnitude of a voltage value of the touch driving signals, and wherein the preset values are either maintained or changed according to a comparison result that measures a difference between the computed flicker noise detection value and the reference flicker noise detection value.

A method of setting driving firmware of a display device includes driving pixels included in a display panel with a display driving circuit, wherein the pixels are driven based on display control firmware; driving touch electrodes of a touch sensing unit with a touch driving circuit, wherein the touch electrodes are driven based on touch driving firmware and generating touch coordinate data; detecting flicker noise of an image displayed on the display panel using a flicker noise detection device; and changing the display control firmware and the touch driving firmware according to a comparison result between a flicker noise detection value detected by the flicker noise detection device and a pre-quantified flicker noise detection value.

In an embodiment, in the driving of the pixels included in the display panel, the display driving circuit generates data voltages according to a display driving frequency value included in the display control firmware and supplies the data voltages to data lines of the display area, and supplies an output signal having a voltage magnitude corresponding to a voltage value of output signals included in the display control firmware to a gate line.

In an embodiment, the driving of the touch electrodes of the touch sensing unit includes generating, by the touch driving circuit, touch driving signals with a voltage magnitude corresponding to a voltage value of a touch driving signal included in the touch driving firmware; and supplying the touch driving signals to the touch electrodes of the touch sensing unit according to a touch driving frequency value included in the touch driving firmware.

In an embodiment, the detecting of the flicker noise of the image displayed on the display panel includes gradually changing a touch driving frequency value and voltage values of output signals of the display control firmware through the flicker noise detection device; gradually changing a touch driving frequency value and voltage values of a touch driving signal of the touch driving firmware; measuring a luminance difference value corresponding to the flicker noise through a photometer; and outputting the luminance difference value as the flicker noise detection value.

In an embodiment, the gradually changing of the display driving frequency and the voltage values of the output signals includes gradually increasing, decreasing, or changing a magnitude of the display driving frequency value included in the display control firmware in units of one or more frame periods within a preset range; gradually increasing, decreasing, or changing the voltage values of the output signal included in the display control firmware in units of one or more frame periods; and sequentially writing the changed display driving frequency value and the changed voltage values of the output signals to the display driving circuit.

In an embodiment, in the gradually changing of the display driving frequency and the voltage values of the output signals, the display control firmware is sequentially written to the display driving circuit while simultaneously changing the magnitude of the display driving frequency value and the voltage values of the output signal during a same time, or alternately changing the magnitude of the display driving frequency value and the voltage values of the output signal at different times.

In an embodiment, the gradually changing of the touch driving frequency and the voltage values of the touch driving signal of the touch driving firmware, includes gradually increasing, decreasing, or changing a magnitude of the touch driving frequency value included in the touch driving firmware in units of one or more frame periods within a preset range, gradually increasing, decreasing, or changing the voltage values of the touch driving signal included in the touch driving firmware in units of one or more frame periods, and sequentially writing the changed touch driving frequency value and the changed voltage values of the tough driving signal to the touch driving circuit.

In an embodiment, in the gradually changing of the touch driving frequency and the voltage values of the touch driving signal of the touch driving firmware, the touch driving firmware is sequentially written to the touch driving circuit while simultaneously changing the magnitude of the touch driving frequency and the voltage value of the touch driving signals during a same time, or alternately changing the magnitude of the touch driving frequency and the voltage value of the touch driving signals at different times.

In an embodiment, in the changing of the display control firmware and the touch driving firmware, preset values for a magnitude of the display driving frequency, a voltage value of the output signals, a magnitude of the touch driving frequency, and a magnitude of a voltage value of the touch driving signals are either changed or maintained according to a comparison result that measures a difference between the flicker noise detection value driven and detected by the display control firmware and the touch driving firmware with the quantified flicker noise detection value.

In an embodiment, the detecting of the flicker noise of the image disposed on the display panel includes sequentially storing a luminance value of a display image detected through a photometer, and detecting luminance difference values between horizontal lines that move in one direction over a time interval; and sequentially outputting flicker index values over the time interval, the flicker index values respectively corresponding to the luminance difference values, and wherein the flicker index values are read from a memory as flicker index values corresponding to the luminance difference value, or the luminance difference value is set as the flicker index value.

The display device and the method of setting the driving firmware of the same according to the embodiments of the present disclosure may set or change the driving firmware according to the amount of occurrence of flicker noise and quantification data for each display device. Accordingly, it is possible to reduce flicker and increase an image display quality of the display device.

BRIEF DESCRIPTION OF THE DRAWINGS

The above and other aspects and features of the present disclosure will become more apparent by describing in detail embodiments thereof with reference to the accompanying drawings, in which:

FIG. 10 illustrates a flicker index value detection result detected by the device of detecting flicker noise;

DETAILED DESCRIPTION

Embodiments of a semiconductor device and methods for setting a firmware of the same will now be described more fully hereinafter with reference to the accompanying drawings. The inventive concept may, however, be embodied in different forms and is not necessarily limited to the embodiments set forth herein. Rather, these embodiments are provided so that this disclosure will be thorough and complete, and will fully convey the scope of the inventive concept to those skilled in the art.

It will also be understood that when a layer is referred to as being "on" another layer or substrate, it can be directly on the other layer or substrate, or intervening layers may also be present, unless language such as "directly disposed on", "directly contacting", or similar is used. The same reference numbers may refer to the same components, and to the extent that description of a component is omitted, it will be appreciated that description for the same or similar components may be found throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Features of the various embodiments of the present disclosure may be combined or combined with each other, in part or in whole, and various interconnecting components and driving methods thereof are possible. Each embodiment may be implemented independently, or various embodiments may be implemented together. It will be appreciated by one of ordinary skill in the art which features of various embodiments may be combined or accommodated to one another without contradiction.

Figure 1:
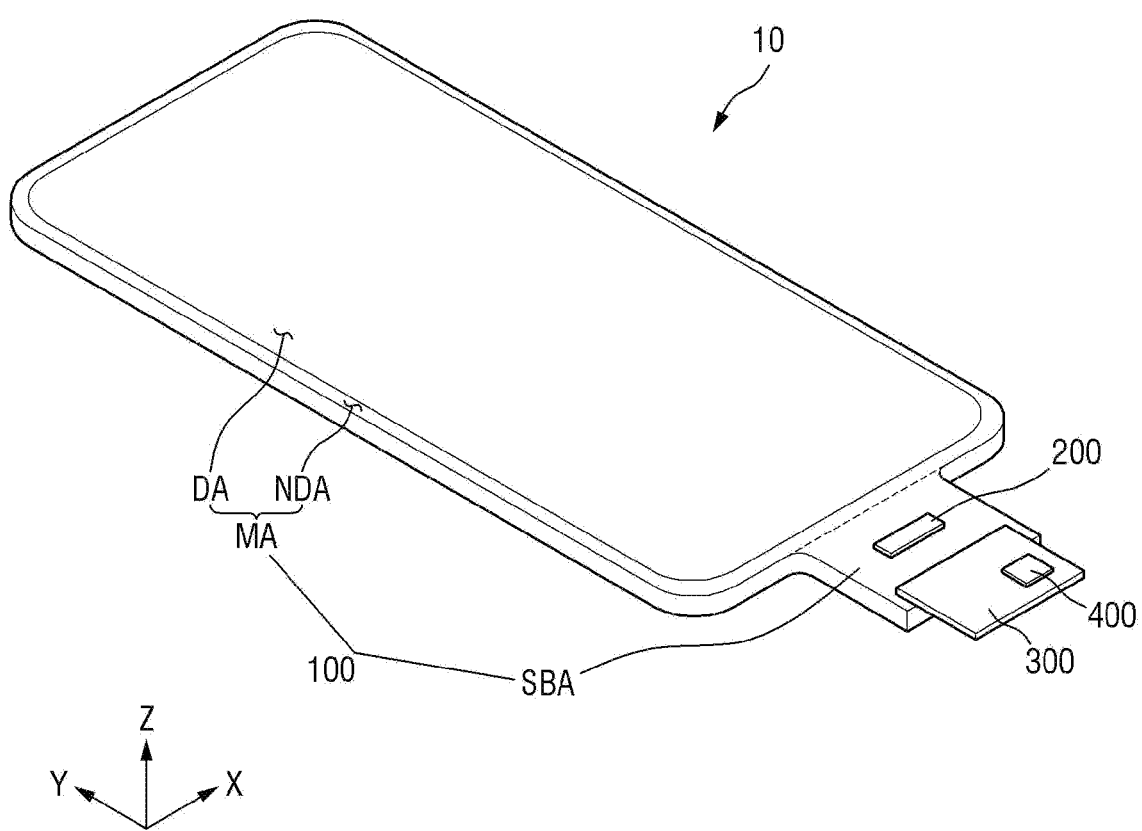
FIG. 1 is a perspective view of a display device according to an embodiment of the present disclosure.
Figure 2:
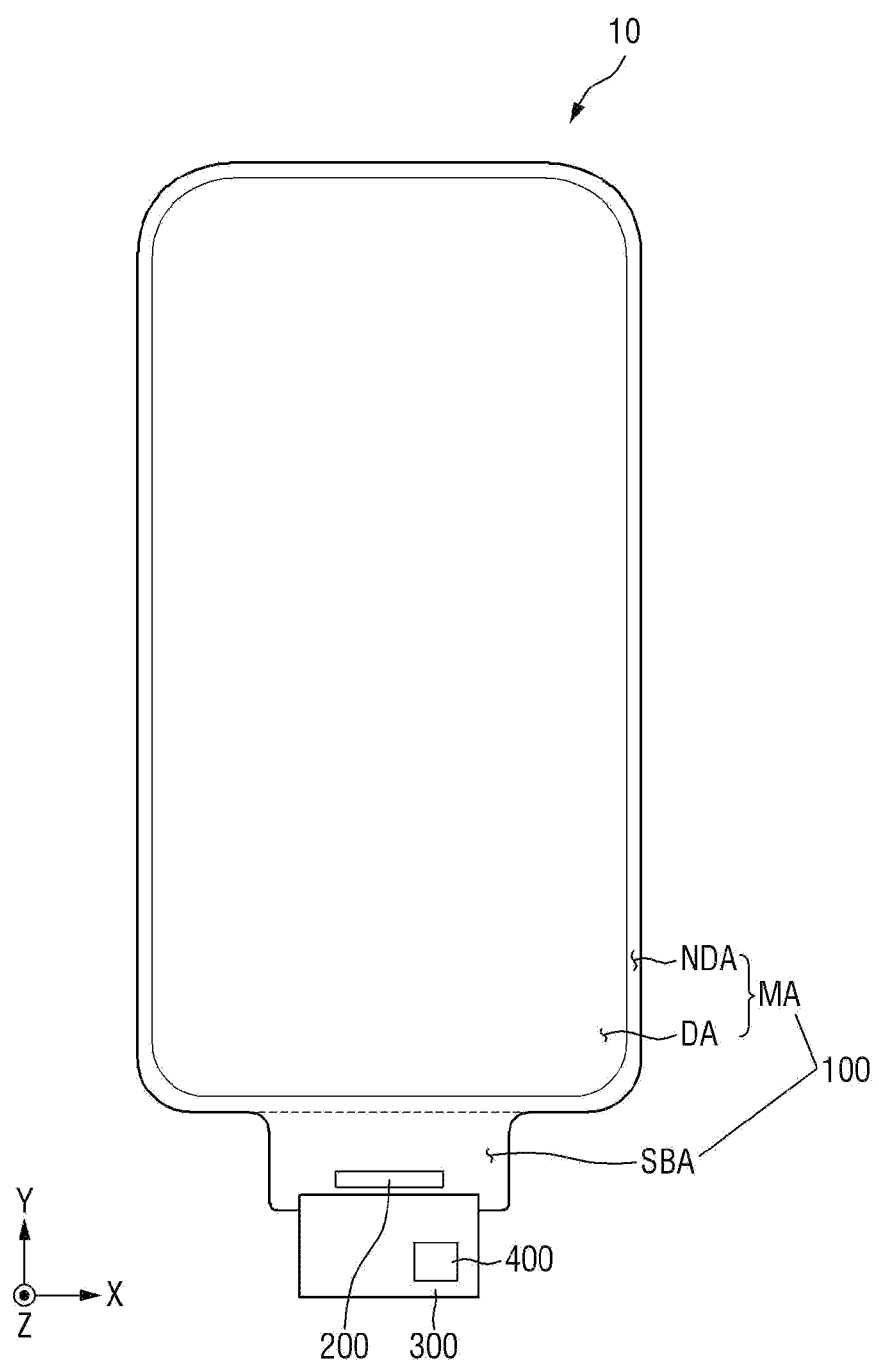
FIG. 2 is a plan view of the display device according to an embodiment of the present disclosure.

Hereinafter, specific embodiments will be described with reference to the accompanying drawings. FIG. 1 is a perspective view of a display device according to an embodiment of the present disclosure. FIG. 2 is a plan view of the display device, and FIG. 3 is a side view of the display device.

Figure 3:
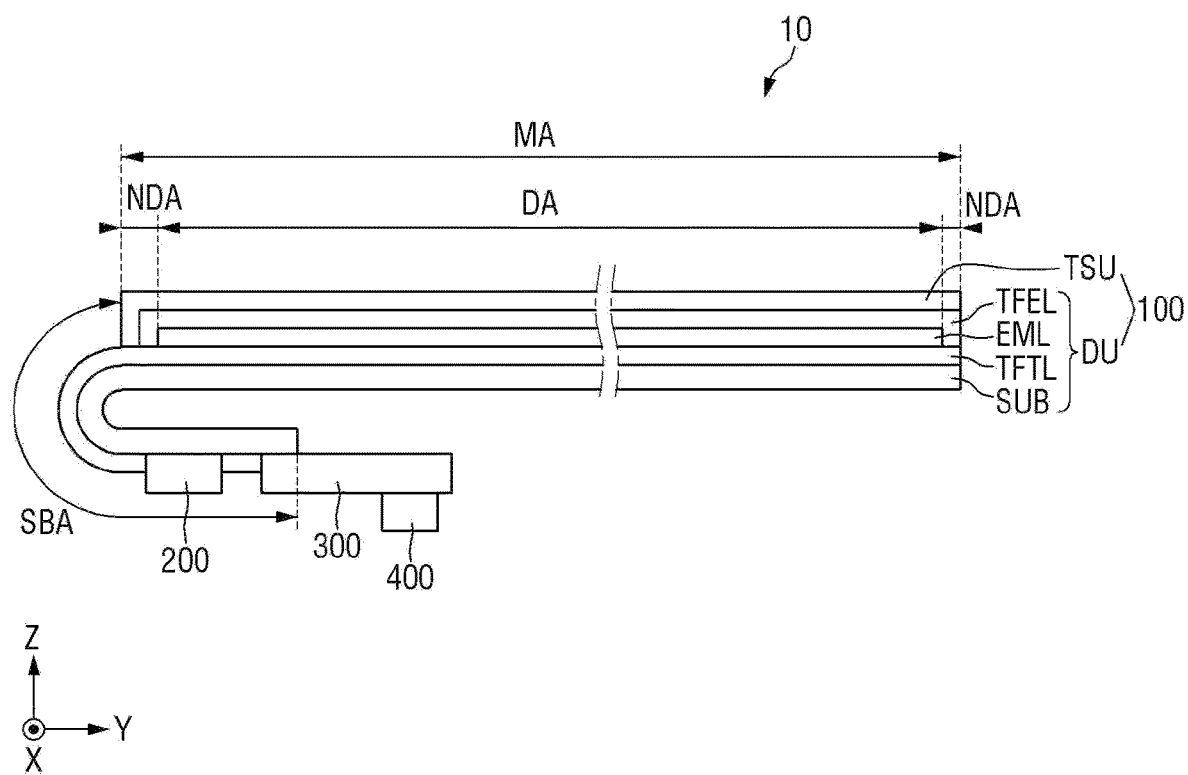
FIG. 3 is a side view of the display device according to an embodiment of the present disclosure.

Referring to FIGS. 1 to 3, a display device 10 of the present disclosure may be applied to a portable electronic device such as a mobile phone, a smartphone, a tablet personal computer (PC), a mobile communication terminal, an electronic notebook, an electronic book, a portable multimedia player (PMP), navigation, an ultra mobile PC (UMPC), or similar. Additional applications of the display device include using the device as a display unit of a television, a laptop computer, a monitor, a billboard, or the Internet of Things (JOT). The display device may also be applied to a wearable device such as a smart watch, a watch phone, a glasses-type display, and a head mounted display (HMD). The display device may also be applied to an instrument panel of a vehicle, a center fascia of a vehicle, a center information display (CID) disposed on a dashboard of a vehicle, a room mirror display substituting for a side mirror of a vehicle, or a display disposed on a rear surface of a front seat as entertainment for a rear seat of a vehicle.

The display device 10 according to an embodiment may be a light emitting display device such as an organic light emitting display device using an organic light emitting diode, a quantum dot light emitting display device including a quantum dot light emitting layer, an inorganic light emitting display device including an inorganic semiconductor, a micro light emitting display device using a micro or nano light emitting diode (micro LED or nano LED), or a device including a combination of these systems. The following mainly describes embodiments of the display device 10 as an organic light emitting display device, but the present disclosure is not necessarily limited thereto.

An embodiment of the display device 10 includes a display panel 100, a display driving circuit 200, a display circuit board 300, and a touch driving circuit 400. The display panel 100 may be formed in a rectangular plane and have a short side which extends in a first direction (e.g., an X-axis direction) and a long side which extends in a second direction (e.g., a Y-axis direction) that intersects the first direction. A corner where the short side of the display device 10 and the long side of the display device 10 meet may be rounded to have a predetermined curvature or may be formed at a right angle. The planar shape of the display panel 100 is not necessarily limited to the rectangular shape, and may be other polygonal shapes, a circular shape, or an elliptical shape.

The display panel 100 may be flat, but is not necessarily limited thereto. For example, some embodiments of the display panel 100 include curved portions that are formed at left and right distal ends (e.g., along the long sides of the display device 10) and have a constant curvature or a varying curvature. In addition, the display panel 100 may be formed flexibly so as to be curved, bent, folded, or rolled during use.

The display panel 100 includes a main area MA and a sub-area SBA. The main area MA includes a display area DA used to display an image and a non-display area NDA which is a peripheral area of the display area DA. The display area DA includes pixels used to display an image. The sub-area SBA may protrude from one side of the main area MA in the second direction (e.g., Y-axis direction).

The sub-area SBA may be extended and unfolded, e.g. as shown in FIGS. 1 and 2. The sub-area SBA may also be bent as illustrated in FIG. 3, and in this case, the sub-area SBA may be disposed adjacent to a lower surface of the display panel 100. When the sub-area SBA is bent, the sub-area SBA may overlap the main area MA in a third direction (e.g., a Z-axis direction) which is a thickness direction of a substrate SUB. The display driving circuit 200 may be disposed in the sub-area SBA.

An embodiment of the display panel 100 further includes a display module DU which includes a substrate SUB, a thin film transistor layer TFTL, a light emitting element layer EML, and an encapsulation layer TFEL, and a touch sensing unit TSU formed on a front surface of the display module DU, as illustrated in FIG. 3. The thin film transistor layer TFTL may be disposed on the substrate SUB. The thin film transistor layer TFTL may be disposed in the main area MA and the sub-area SBA. The thin film transistor layer TFTL includes thin film transistors.

The light emitting element layer EML may be disposed on the thin film transistor layer TFTL. The light emitting element layer EML may be disposed in the display area DA of the main area MA. The light emitting element layer EML includes light emitting elements. In some embodiments, the light emitting elements are disposed in corresponding light emitting portions.

The encapsulation layer TFEL may be disposed on the light emitting element layer EML. The encapsulation layer TFEL may be disposed in the display area DA and the non-display area NDA of the main area MA. Embodiments of the encapsulation layer TFEL include at least one inorganic layer and at least one organic layer. The encapsulation layer TFEL encapsulates the light emitting element layer.

The touch sensing unit TSU may be formed or mounted on the encapsulation layer TFEL. The touch sensing unit TSU may be disposed on the display area DA of the main area MA. The touch sensing unit TSU may sense a touch of a person or an object through the use of touch electrodes.

A cover window may be disposed on the touch sensing unit TSU. The cover window may protect an upper portion of the display panel 100, and may be attached to the touch sensing unit TSU by a transparent adhesive member such as an optically clear adhesive (OCA) film or an optically clear resin (OCR). The cover window may be made of an inorganic material such as glass or be made of an organic material such as plastic or a polymer material. A polarizing film may be additionally disposed between the touch sensing unit TSU and the cover window. The polarizing film may, for example, prevent visible reflections from external light, and increase image quality of the display device.

The display driving circuit 200 may generate control signals and data voltages for driving the display panel 100. The display driving circuit 200 may be formed as an integrated circuit (IC) and may be attached onto the display panel 100 by a chip on glass (COG) method, a chip on plastic (COP) method, or an ultrasonic bonding method, but is not necessarily limited thereto. For example, the display driving circuit 200 may be attached onto the display circuit board 300 in a chip on film (COF) method.

The display circuit board 300 may be attached to one end of the sub-area SBA of the display panel 100. The display circuit board 300 may be electrically connected to the display panel 100 and the display driving circuit 200. The display panel 100 and the display driving circuit 200 may receive digital video data, timing control signals, and driving voltages through the display circuit board 300. The display circuit board 300 may include a flexible film such as a flexible printed circuit board, a printed circuit board, or a chip on film.

The touch driving circuit 400 may be disposed on the display circuit board 300. The touch driving circuit 400 may be formed as an integrated circuit (IC) and attached to the display circuit board 300.

The touch driving circuit 400 may be electrically connected to the touch electrodes of the touch sensing unit TSU. The touch driving circuit 400 applies touch driving signals to the touch electrodes of the touch sensing unit TSU, and measures a change in charge of each of a plurality of touch nodes formed by the touch electrodes. For example, the charge in each of the plurality of touch nodes may correspond to a mutual capacitance between the touch nodes. In some embodiments, the touch driving circuit 400 measures a change in capacitance of the plurality of touch nodes according to a change in the magnitude of a voltage or the amount of current of a touch sensing signal received through the touch electrodes. In this way, the touch driving circuit 400 may determine the presence of a user's touch, a user's approach, and the like, according to the amount of change of stored charge in the mutual capacitance of each of the plurality of touch nodes. The user's touch indicates that a user's finger or an object such as a pen comes into direct contact with one surface of the cover window disposed on the touch sensing unit TSU. The user's approach indicates that the user's finger or the object such as the pen hovers above one surface of the display panel 10.

The touch driving circuit 400 may extract touch coordinates or switch a driving mode by itself by compensating the touch sensing signals according to a noise application level according to a low-temperature driving, a charging mode, a high-frequency application, an electromagnetic noise application state, and the like. Specifically, the touch driving circuit 400 may sense a user's touch by selectively changing a touch sensing area according to whether a body portion positioned in a front direction of the display panel 100 is detected, and may change the driving mode to a low power mode or a standby mode.

Figure 4:
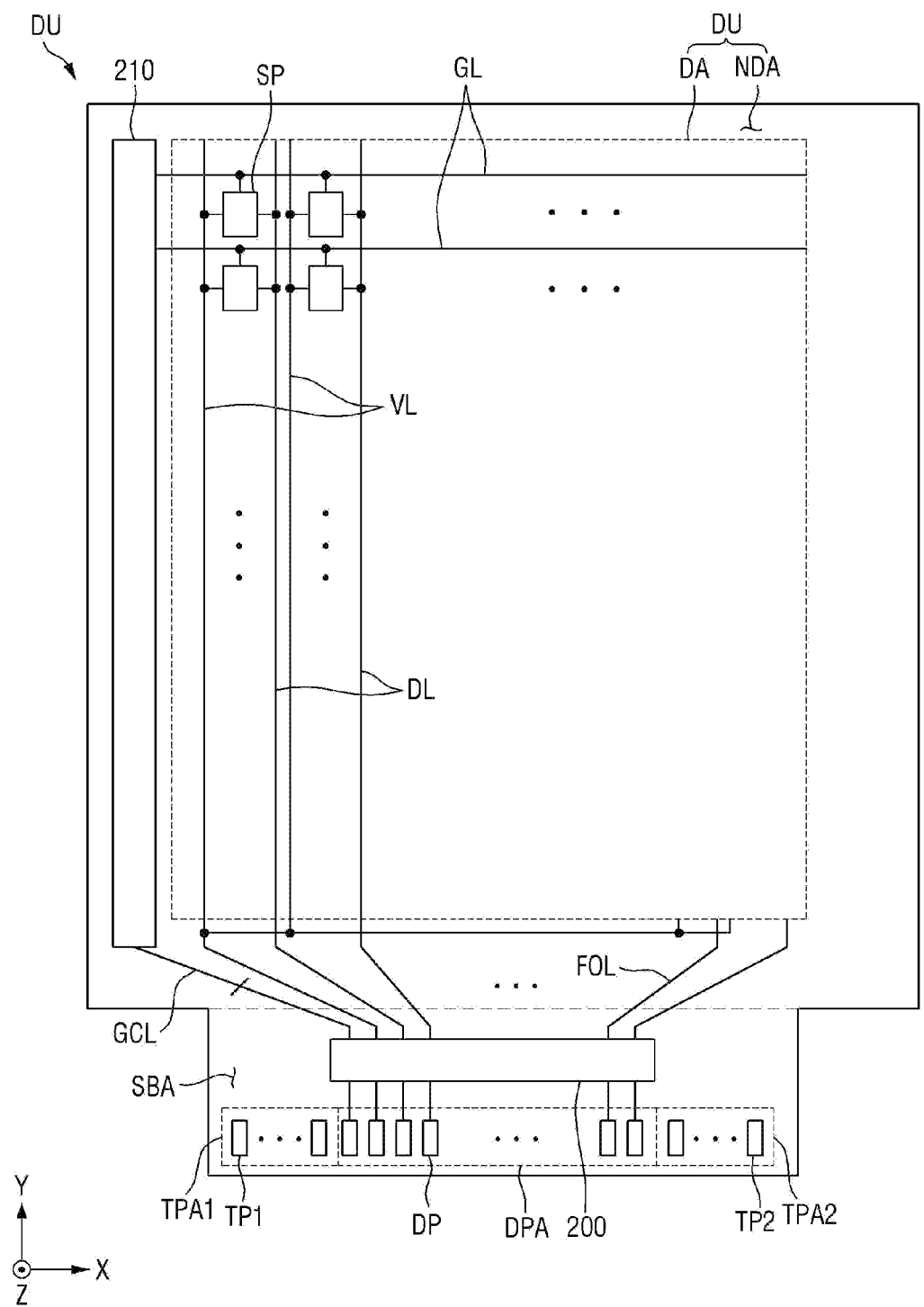
FIG. 4 is a layout view that schematically illustrates an example of a display panel illustrated in FIGS. 1 to 3.

FIG. 4 is a layout view that schematically illustrates an example of a display panel illustrated in FIGS. 1 to 3. Specifically, FIG. 4 is a layout view of a display area DA and a non-display area NDA of the display module DU before the touch sensing unit TSU is formed.

The display area DA is an area in which images are displayed, and may be a central area of the display panel 100. The display area DA may include a plurality of pixels SP, a plurality of gate lines GL, a plurality of data lines DL, and a plurality of power lines VL. Each of the plurality of pixels SP may be, for example, the smallest unit capable of outputting light in the display.

The plurality of gate lines GL may supply a gate signal or a plurality of gate signals received from the gate driving unit 210 to the plurality of pixels SP. The plurality of gate lines GL may extend in the X-axis direction and may be spaced apart from each other (e.g., arranged) in the Y-axis direction intersecting the X-axis direction.

The plurality of data lines DL may supply a data voltage or a plurality of data voltages received from the display driving circuit 200 to the plurality of pixels SP. The plurality of data lines DL may extend in the Y-axis direction and may be spaced apart from each other in the X-axis direction.

The plurality of power lines VL may supply a power voltage or plurality of power voltages received from the display driving circuit 200 to the plurality of pixels SP. Here, the power voltage include one of a driving voltage, an initialization voltage, a reference voltage, or a combination thereof (e.g., provided in series or in parallel through, e.g., multiplexing). The plurality of power lines VL may extend in the Y-axis direction and may be spaced apart from each other in the X-axis direction.

The non-display area NDA may surround the display area DA. The non-display area NDA may include a gate driving unit 210, fan-out lines FOL, and gate control lines GCL disposed therein. The gate driving unit 210 may generate a plurality of gate signals based on a gate control signal, and may sequentially supply the plurality of gate signals to the plurality of gate lines GL according to a set order.

The fan-out lines FOL may extend from the display driving circuit 200 to the display area DA. The fan-out lines FOL may supply the data voltage or plurality of data voltages received from the display driving circuit 200 to the plurality of data lines DL.

The gate control line GCL may extend from the display driving circuit 200 to the gate driving unit 210. The gate control line GCL may supply the gate control signal or plurality of gate control signals received from the display driving circuit 200 to the gate driving unit 210.

The sub-area SBA may include a display driving circuit 200, a display pad area DPA, and first and second touch pad areas TPA1 and TPA2. The display driving circuit 200 may output timing control signals and data voltages for driving the display panel 100 to the fan-out lines FOL. The display driving circuit 200 generates timing control signals according to a display driving frequency set in firmware based on preset display control firmware, and generates data voltages corresponding to image data.

The display driving circuit 200 may supply the data voltage to the data lines DL through the fan-out lines FOL according to the display driving frequency set in the firmware. Here, the data voltage may be supplied to the plurality of pixels SP and may determine a luminance of the plurality of pixels SP. In addition, the display driving circuit 200 may supply timing control signals generated according to the display driving frequency and gate voltage value of the firmware to the gate driving unit 210 through the gate control line GCL.

The display pad area DPA, the first touch pad area TPA1, and the second touch pad area TPA2 may be disposed at or adjacent to an edge of the sub-area SBA. Components disposed within the display pad area DPA, the first touch pad area TPA1, and the second touch pad area TPA2 may be electrically connected to the circuit board 300 using an anisotropic conductive film or a low-resistance and high-reliability material such as SAP.

The display pad area DPA may include a plurality of display pad portions. The plurality of display pad portions may be connected to a distinct main processor through the circuit board 300. The plurality of display pad portions may be connected to the circuit board 300 and receive digital video data, and may supply the digital video data to the display driving circuit 200.

Figure 5:
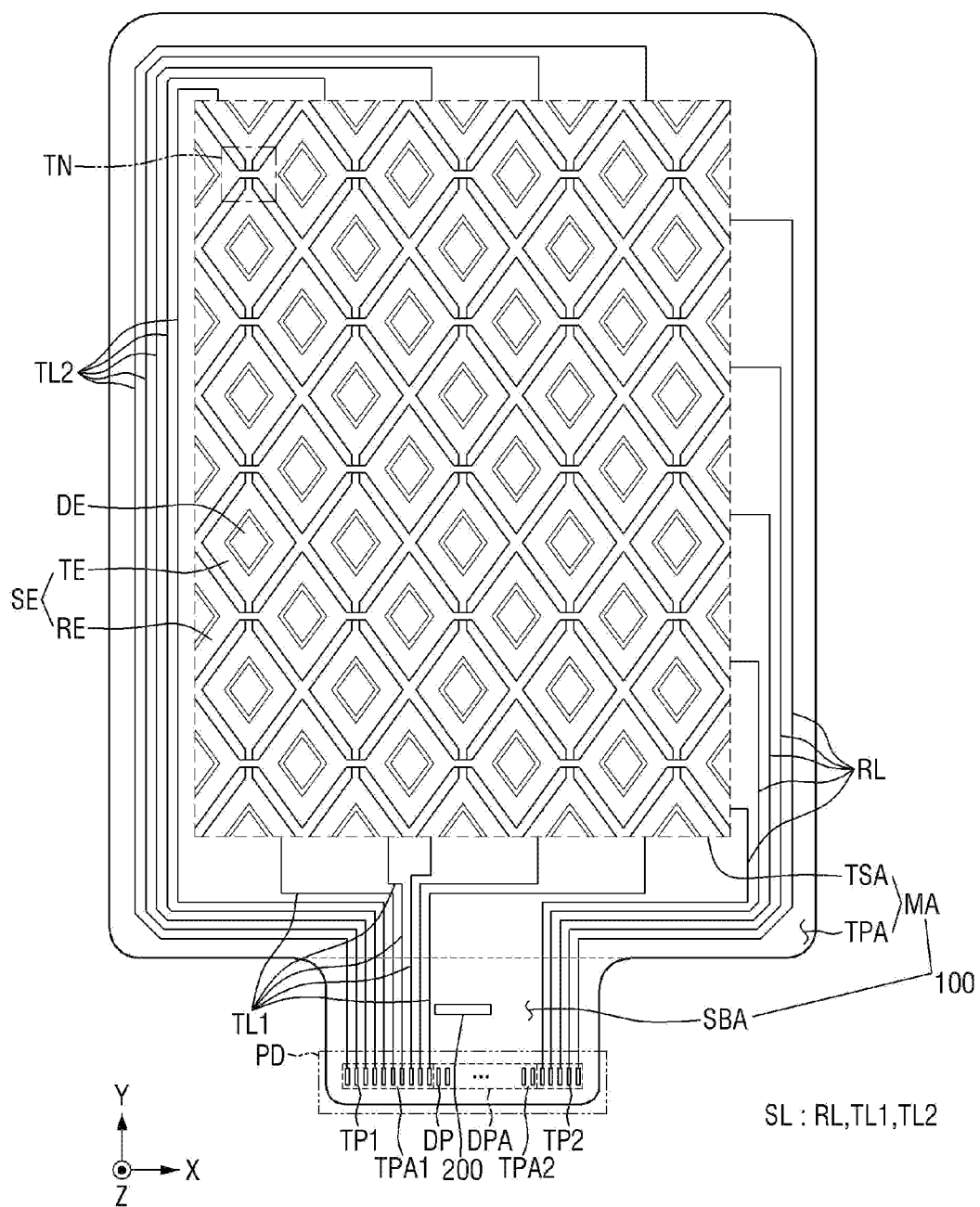
FIG. 5 is a layout view that schematically illustrates an example of a touch sensing unit illustrated in FIG. 3.

FIG. 5 is a layout view that schematically illustrates an example of a touch sensing unit illustrated in FIG. 3. The following describes an embodiment in which touch electrodes SE of the main area MA include two types of electrodes, for example, driving electrodes TE and sensing electrodes RE, and are driven in a mutual capacitive manner of sensing an amount of change in the stored charge of a mutual capacitance of each of a plurality of touch nodes through the sensing electrodes RE after applying touch driving signals to the driving electrodes TE, but the present disclosure is not necessarily limited thereto. For example, the inventive concept described herein may be applied to a self-capacitance touch sensing unit.

The embodiment shown in FIG. 5 includes driving electrodes TE, the sensing electrodes RE, dummy patterns DE, touch lines SL, and first and second touch pads TP1 and TP2. Referring to FIG. 5, the main area MA of the touch sensing unit TSU includes a touch sensing area TSA for sensing a user's touch and a touch peripheral area TPA disposed around the touch sensing area TSA. The touch sensing area TSA may at least partially overlap the display area DA of FIGS. 1 to 3, and the touch peripheral area TPA may at least partially overlap the non-display area NDA.

The driving electrodes TE, the sensing electrodes RE, and the dummy patterns DE are disposed in the touch sensing area TSA. The driving electrodes TE and the sensing electrodes RE may form a mutual capacitance be configured to sense a touch of an object or a person.

The sensing electrodes RE may be arranged in parallel in the first direction (e.g., X-axis direction) and the second direction (e.g., Y-axis direction). For example, the sensing electrodes RE may be formed in rows which extend along the first direction. The rows may be parallel to each other, and be arranged in the second direction. The sensing electrodes RE may be electrically connected to each other in the first direction (e.g., X-axis direction).

The sensing electrodes RE that are adjacent to each other in the first direction (e.g., X-axis direction) may be connected to each other. The sensing electrodes RE that are adjacent to each other in the second direction (e.g., Y-axis direction) may be electrically separated from each other. A touch node TN may be disposed at each of intersection portions between the driving electrodes TE and the sensing electrodes RE. Mutual capacitance and changes thereof may be measured at the touch node TN. A plurality of touch nodes TN may correspond to the intersection portions between the driving electrodes TE and the sensing electrodes RE.

The driving electrodes TE may be arranged in parallel in the first direction (e.g., X-axis direction) and the second direction (e.g., Y-axis direction). For example, the driving electrodes TE may be formed in columns which extend along the second direction. The columns may be parallel to each other, and be arranged in the first direction. The driving electrodes TE adjacent to each other in the first direction (e.g., X-axis direction) may be electrically separated from each other. The driving electrodes TE may be electrically connected to each other in the second direction (e.g., Y-axis direction). The driving electrodes TE adjacent to each other in the second direction (e.g., Y-axis direction) may be connected to each other through a distinct connection electrode.

Each of the dummy patterns DE may be surrounded by the driving electrode TE or the sensing electrode RE. Each of the dummy patterns DE may be separated from the driving electrode TE or the sensing electrode RE. Each of the dummy patterns DE may be spaced apart from the driving electrode TE or the sensing electrode RE. Each of the dummy patterns DE may be electrically floated.

FIG. 5 illustrates an example in which each of the driving electrodes TE, the sensing electrodes RE, and the dummy patterns DE has a rhombic planar shape, but the present disclosure is not necessarily limited thereto. For example, each of the driving electrodes TE, the sensing electrodes RE, and the dummy patterns DE may have a different planar shape, such as a quadrangle other than a rhombus, a polygon other than a quadrangle, a circle, or an oval.

The touch lines SL may be disposed in the sensor peripheral area TPA. The touch lines SL include first touch driving lines TL1 and second touch driving lines TL2 connected to the driving electrodes TE, and touch sensing lines RL connected to the sensing electrodes RE.

Each of the sensing electrodes RE disposed at an end on one side of the touch sensing area TSA may be connected to the touch sensing lines RL in a one-to-one manner. For example, as illustrated in FIG. 5, each of the sensing electrodes RE disposed at a right end of the touch sensing area TSA among the sensing electrodes RE electrically connected to each other in the first direction (e.g., X-axis direction) may be connected to each of the touch sensing lines RL. Each of the touch sensing lines RL may be connected to the second touch pads TP2 disposed on the pad portion PD in a one-to-one manner.

The driving electrodes TE disposed at an end on one side of the touch sensing area TSA may be connected to the first touch driving lines TL1 in a one-to-one manner, and the driving electrodes TE disposed at an end on the other side of the touch sensing area TSA may be connected to the second touch driving lines TL2 in a one-to-one manner. For example, the driving electrodes TE disposed at a lower end of the touch sensing area TSA among the driving electrodes TE electrically connected to each other in the second direction (e.g., Y-axis direction) may be respectively connected to the first touch driving lines TL1, and the driving electrodes TE disposed at an upper end of the touch sensing area TSA among the driving electrodes TE electrically connected to each other in the second direction (e.g., Y-axis direction) may be respectively connected to the second touch driving lines TL2. In some embodiments, the second touch driving lines TL2 are disposed in a left outer side region of the touch sensing area TSA. For example, the second touch driving lines TL2 may be connected to the driving electrodes TE at an upper side of the touch sensing area TSA via a left outer side of the touch sensing area TSA.

The first touch driving lines TL1 and the second touch driving lines TL2 may be connected to the first touch pads TP1 disposed on the pad portion PD in a one-to-one manner. The driving electrodes TE are connected to the first and second touch driving lines TL1 and TL2 at both sides of the touch sensing area TSA and receive a touch driving signal. This configuration may prevent a difference between the touch driving signal applied to the driving electrodes TE disposed on a lower side of the touch sensing area TSA and the touch driving signal applied to the driving electrodes TE disposed on an upper side of the touch sensing area TSA due to, for example, an RC delay.

As illustrated in FIGS. 1 to 3, when the display circuit board 300 is connected to one side of the flexible film, the pads disposed in display pad area DPA and in the first and second touch pad areas TPA1 and TPA2 of the pad portion PD may correspond to pads of the display panel 100 connected to the display circuit board 300. Therefore, the pads of the display panel 100 may be in contact with the display pads DP, the first touch pads TP1, and the second touch pads TP2. The display pads DP, the first touch pads TP1, and the second touch pads TP2 may be electrically connected to the pads of the display circuit board 300 using an anisotropic conductive film or a low-resistance and high-reliability material such as SAP. Therefore, the display pads DP, the first touch pads TP1, and the second touch pads TP2 may be electrically connected to the touch driving circuit 400 disposed on the display circuit board 300.

The touch driving circuit 400 generates touch driving signals according to the touch driving frequency and driving voltage value set in the firmware based on the touch driving firmware. The touch driving circuit 400 outputs the touch driving signals from the driving electrode TE disposed at the leftmost side of the touch sensing area TSA to the driving electrode TE disposed at the rightmost side of the touch sensing area TSA at a speed according to the touch driving frequency. In this case, the touch driving circuit 400 may sequentially output the touch driving signals from the driving electrode TE disposed at the leftmost side to the driving electrode TE disposed at the rightmost side. In contrast, some embodiments of the touch driving circuit 400 may group the driving electrodes TE into a preset number of groups according to programming of the firmware, and may output the touch driving signals to the driving electrodes TE in each group, e.g., simultaneously. In this case, the touch driving signals may be output as a plurality of pulse signals that are generated with a magnitude ranging from about 1.8 V to 2.2 V based on a driving voltage value included in firmware.

The touch driving circuit 400 senses an amount of change in the stored charge in mutual capacitance of each of the touch nodes TN from the touch sensing lines RL of the touch sensing unit TSU and the second touch pads TP2 through second touch pogo pads. The touch driving circuit 400 may include operational amplifiers for sensing the amount of change in the stored charge in the mutual capacitance of the touch nodes TN. Accordingly, the touch driving circuit 400 may sequentially convert output voltages of the second touch pogo pads amplified by the operational amplifiers, that is, output voltages according to the amount of change in the stored charge of each of the touch nodes TN, into touch data in the form of digital data. In addition, the touch driving circuit 400 extracts a difference data value by sequentially comparing the touch data for the touch sensing signals with preset sensing reference data. Accordingly, the touch driving circuit 400 may calculate touch position coordinates based on the identification of touch data that has a difference data value greater than an average value among sequentially detected touch data, and supply the touch position coordinates to the display driving circuit 200.

As described with reference to FIGS. 4 and 5, the display driving circuit 200 drives the pixels SP of the display area DA based on previously stored display control firmware. For example, the display driving circuit 200 may use the display driving frequency, the control signal output timing, and the output voltage values from the display control firmware.

The touch driving circuit 400, meanwhile, drives the touch electrodes SE with the display driving frequency and touch driving signals according to touch driving firmware in units of at least one frame period based on previously stored touch driving firmware. A frame period may be time interval that is equal to a reciprocal of a frame frequency, such as a display frame frequency or a touch driving frame frequency.

However, since the touch sensing unit TSU is disposed on a front portion of the display panel 100, interference caused by different driving frequencies or a voltage difference between the control signals may occur. This can result in flicker noise between the display panel 100 and the touch sensing unit TSU. For example, the display device may produce apparent horizontal lines when the display panel 100 and the touch sensing unit TSU sequentially display an image and sense a touch if an image display period of the display panel 100 and a touch sensing period of the touch sensing unit TSU are differently set. In another example, flicker noise may manifest as apparent horizontal lines that move up or down when the display panel 100 and the touch sensing unit TSU are simultaneously driven as the image display period of the display panel 100 and the touch sensing period of the touch sensing unit TSU are set to be the same. It is possible, however, to minimize the interference caused by the driving frequencies or the voltage difference between the control signals between the display panel 100 and the touch sensing unit TSU, by setting the display control firmware of the display panel 100 and the touch driving firmware of the touch sensing unit TSU in a manner that will be described below.

Figure 6:
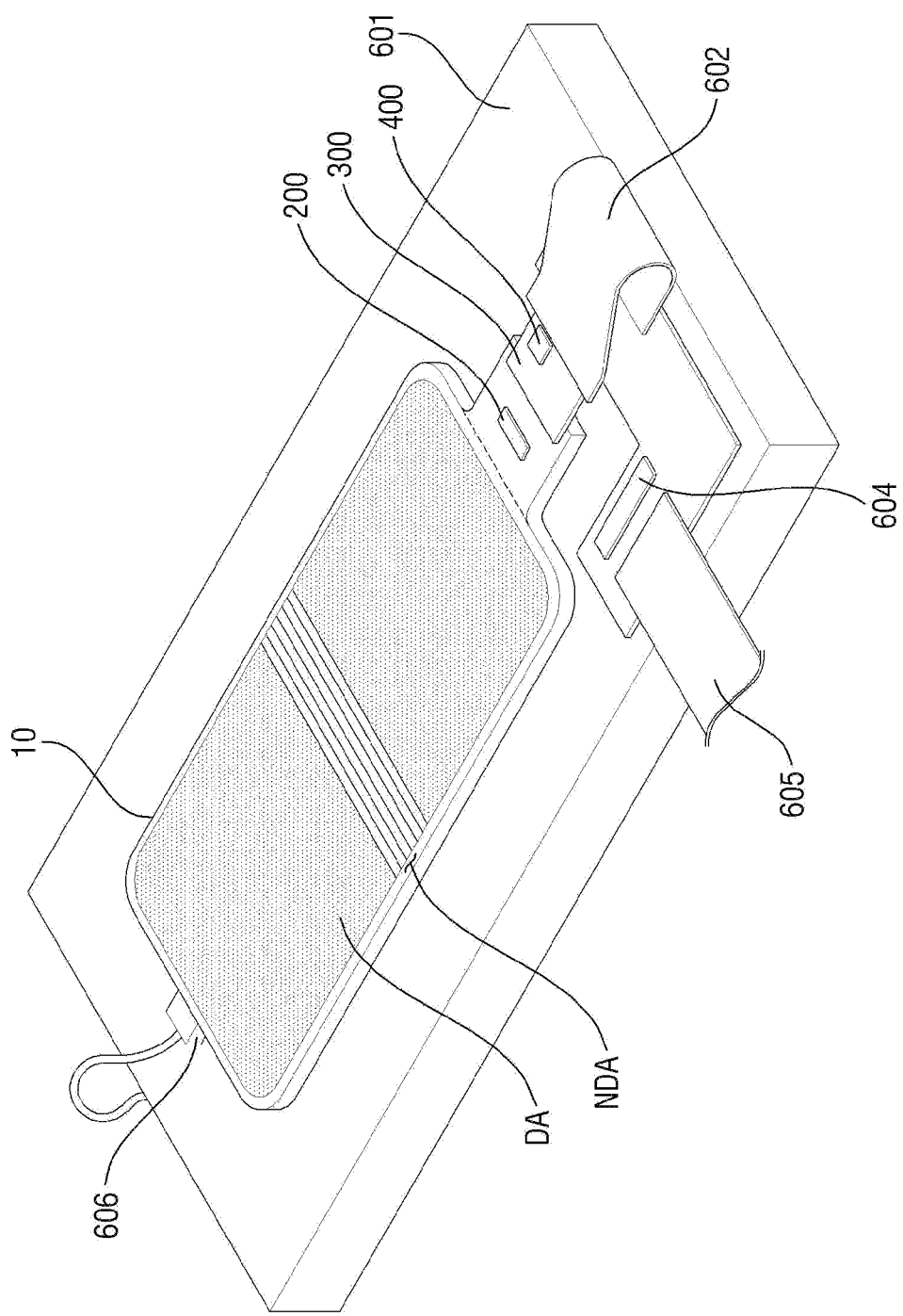
FIG. 6 is a view that illustrates a device and method of detecting flicker noise of a display device.

FIG. 6 illustrates a device and a method of detecting flicker noise of a display device. The device illustrated here may be referred to as a flicker noise detection device. Referring to FIG. 6, embodiments check and quantify the magnitude of the flicker noise generated by the display control firmware and the touch driving firmware for each display device 10 in a method for minimizing the interference caused by the driving frequency, the gate signal, the driving voltage, the voltage difference, and the like between the display panel 100 and the touch sensing unit TSU.

For example, the magnitude of occurrence of the flicker noise may be detected while changing the display control firmware and the touch driving firmware of the display device 10 for each model or product by using the flicker noise detection device illustrated in FIG. 6. In an example, the flicker noise detection device may be configured to hold the display device, and perform various measurements thereon. The flicker noise detection device may include a loading unit 601 on which the display device 10 is loaded, a first flexible circuit unit 602, a firmware setting circuit 604, a second flexible circuit unit 605, and a power supply unit 606. The functionality of these components will be described in detail below.

A magnitude of the flicker noise may be measured as a luminance difference between a reference value in a controlled environment (e.g., image data with known pixel values) and a measured value produced by the display device. In an example process, the magnitude of the flicker noise may be detected by gradually changing the display driving frequency and the voltage values of the gate signal of the display control firmware and also gradually changing the touch driving frequency and the voltage values of the touch driving signal of the touch driving firmware, respectively, using the flicker device detection component. By taking luminance measurements while making these adjustments, it is possible to quantify the magnitude of occurrence of the flicker noise based on measured results of one or more of display driving frequency, voltage values of the gate signal of the display control firmware, touch driving frequency, and the voltage values of the touch driving signal of the touch driving firmware.

FIG. 6 illustrates additional details about the above-described process. In an example, a flicker detection pattern image may be displayed on the display area DA of the display device 10, and the flicker detection pattern image may be set as an image in which white or gray horizontal line patterns of high gradation and high luminance are displayed on a black background of low gradation and low luminance. Then, various components of the flicker noise detection device are used to quantify the flicker noise.

The firmware setting circuit 604 may supply flicker detection pattern image data to the display driving circuit 200 of the display device 10 through the first flexible circuit unit 602. The firmware setting circuit 604 may provide the display control firmware which includes configured values for the display driving frequency, the voltage values of the driving signal, and the timing control signals to the display device 10. The touch driving firmware, which includes values for the touch driving frequency and the voltage value(s) of the touch driving signals, may be transmitted to the touch driving circuit 400. Accordingly, the display device 10 may display the flicker detection pattern image in the display area DA according to the display control firmware and the timing control signals. In some embodiments, the touch driving circuit 400 may drive the touch electrodes SE of the touch sensing unit TSU according to the touch driving firmware.

Figure 7:
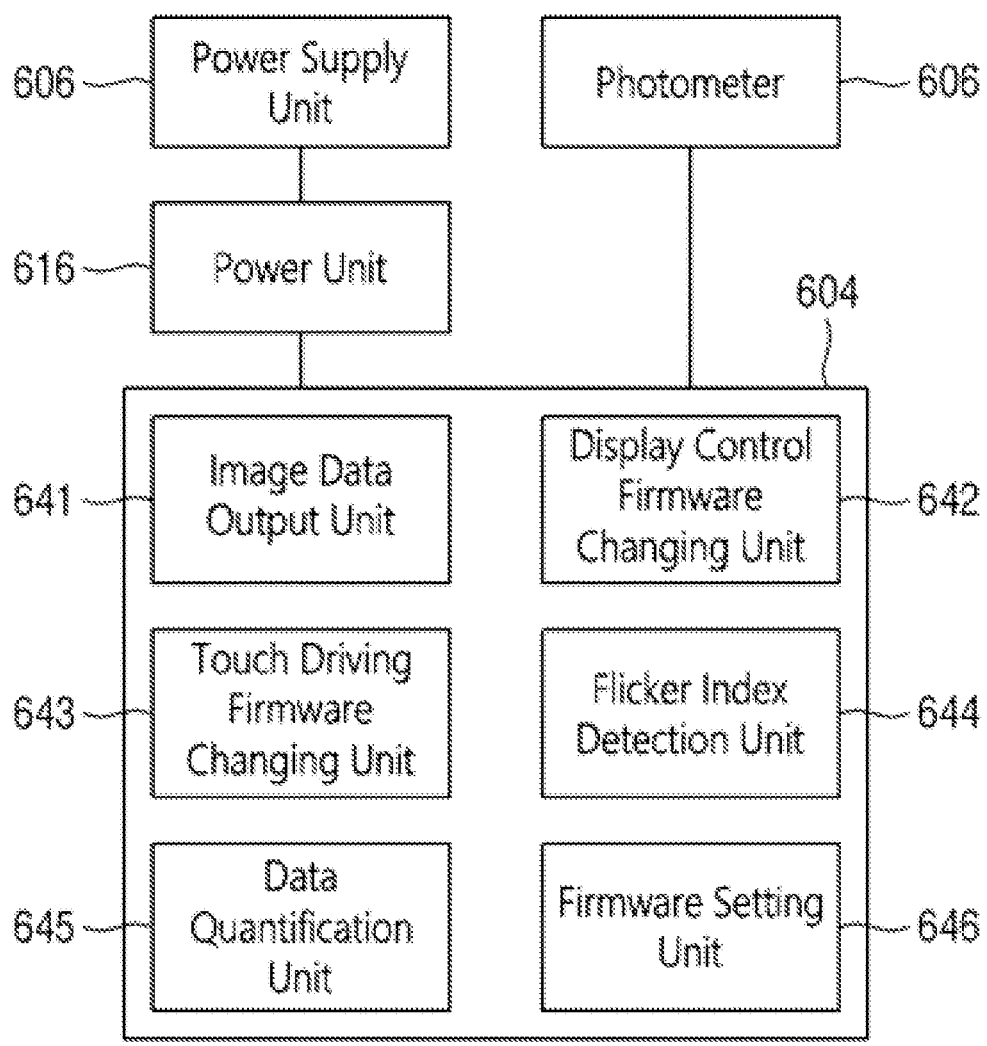
FIG. 7 is a configuration block diagram that illustrates flicker noise detection device used to detect flicker noise of the display device.

FIG. 7 is a configuration block diagram that illustrates a flicker noise detection device used to detect flicker noise of the display device. In addition, FIG. 8 illustrates a method of detecting and quantifying flicker noise of the display device.

Figure 8:
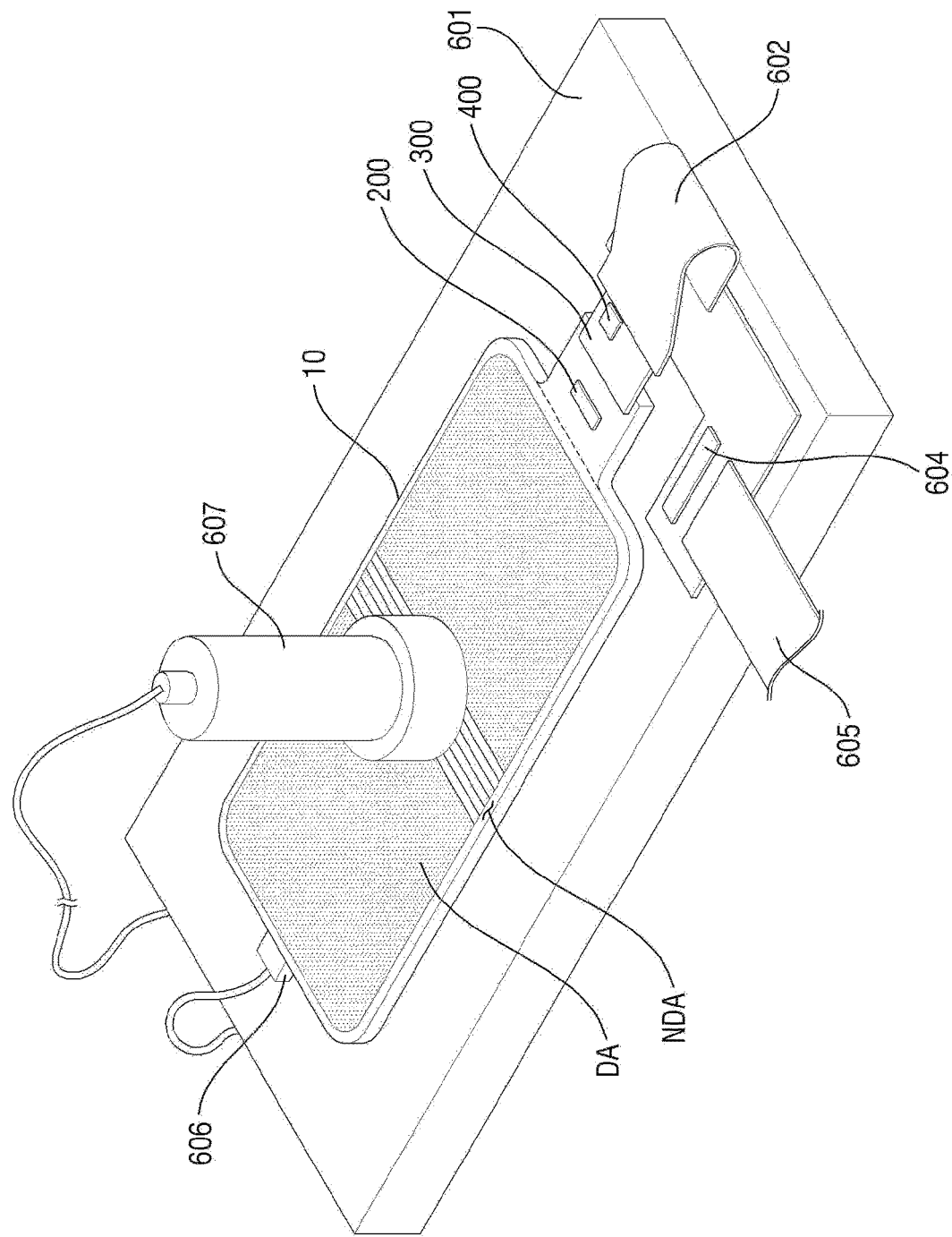
FIG. 8 illustrates a method of detecting and quantifying flicker noise of the display device.

Referring to FIGS. 7 and 8, a flicker noise detection device further includes a photometer 607 for measuring a change in luminance of the flicker detection pattern by photographing the flicker detection pattern image displayed on the display area DA of the display device 10. Here, the photometer 607 may include an imaging device for detecting the luminance of the display image and a luminance measuring circuit for measuring a change in a luminance value of the display image. In addition, the flicker noise detection device may further include a power unit 616 such as a battery for supplying a power signal to the display device 10 through the power supply unit 606 during a flicker measurement period.

The firmware setting circuit 604 of the flicker noise detection device may include an image data output unit 641, a display control firmware changing unit 642, a touch driving firmware changing unit 643, a flicker index detection unit 644, a data quantification unit 645, and a firmware setting unit 646.

The image data output unit 641 supplies preset flicker detection pattern image data to the display driving circuit 200 of the display device 10 during the flicker measurement period. The flicker detection pattern image may be preset as an image in which a large number of white or gray horizontal line patterns of high gradation are displayed on a black background of low gradation, but the present disclosure is not necessarily limited thereto. The flicker detection pattern image may include different data or be applied differently depending on the type or model and driving characteristics of the display device 10.

The display control firmware changing unit 642 changes the magnitude (or speed) of the display driving frequency set in the display control firmware. The display control firmware changing unit may also change the output signal voltage values of the gate signal, and write the changed display control firmware to the display driving circuit 200.

For example, the display control firmware changing unit 642 may gradually increase or decrease and change the magnitude of the display driving frequency set in the display control firmware in units of one or more frame periods within a preset range, and may sequentially write the display control firmware changed in units of one or more frame periods to the display driving circuit 200.

The display control firmware changing unit 642 may gradually increase or decrease and change the voltage values of the output signal set in the display control firmware, for example, the voltage values of the output signal such as the gate signal in units corresponding to one or more frame periods, and may sequentially write the display control firmware changed in units of one or more frame periods to the display driving circuit 200.

The display control firmware changing unit 642 may also simultaneously change the magnitude of the display driving frequency and the voltage values of the output signal. However, the disclosure is not necessarily limited thereto, and in some embodiments the display control firmware changing unit 642 may also alternately change the magnitude of the display driving frequency and the voltage values of the output signal at different points of time.

The touch driving firmware changing unit 643 changes the magnitude of the touch driving frequency and the magnitude of at least one of the voltage values of the touch driving signal included in the touch driving firmware, and writes the changed touch driving firmware to the touch driving circuit 400.

For example, the touch driving firmware changing unit 643 may gradually increase or decrease and change the magnitude of the touch driving frequency set in the touch driving firmware in units of one or more frame periods within a preset range, and may sequentially write the touch driving firmware changed in units of one or more frame periods to the touch driving circuit 400.

In addition, the touch driving firmware changing unit 643 may gradually increase or decrease and change the voltage value of the touch driving signals set in the touch driving firmware in units of one or more frame periods within, and may sequentially write the touch driving firmware changed in units of one or more frame periods to the touch driving circuit 400.

The touch driving firmware changing unit 643 may simultaneously change the magnitude of the touch driving frequency and the voltage value of the touch driving signals at the same point of time. However some embodiments of the touch driving firmware changing unit 643 may also alternately change the magnitude of the touch driving frequency and the voltage value of the touch driving signals at different points of time.

Figure 9:
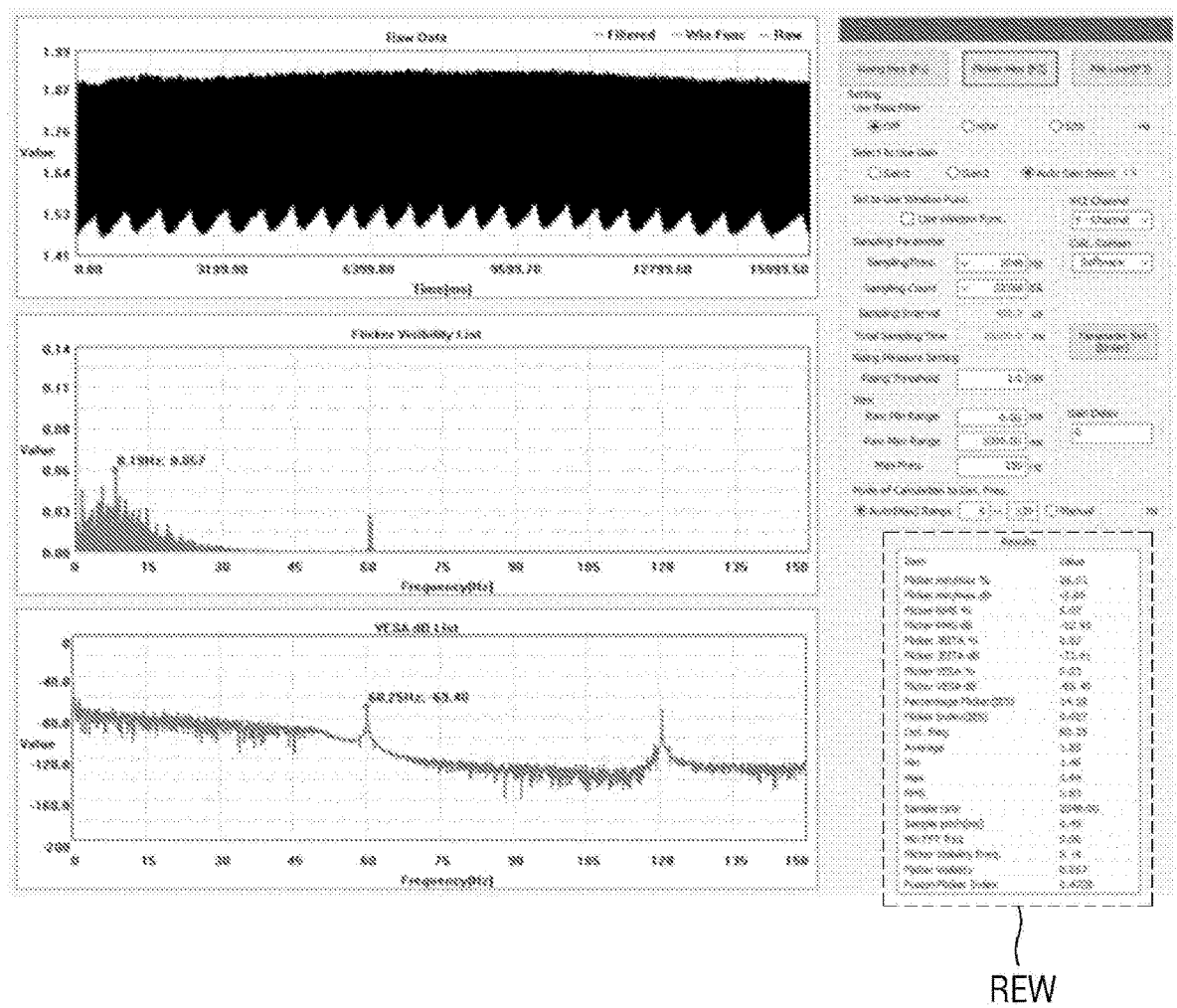
FIG. 9 illustrates a flicker noise detection result of the display device.

FIG. 9 illustrates a flicker nose detection result of the display device. In addition, FIG. 10 illustrates a flicker index value detection result detected by the device of detecting flicker noise.

Referring to FIGS. 9 and 10, the flicker index detection unit 644 sequentially stores a luminance value of the display image detected through the photometer 607, and sequentially detects a luminance difference value between the horizontal lines that move in one direction in small increments. In addition, the flicker index detection unit 644 sequentially outputs flicker index values respectively corresponding to the luminance difference values. Flicker index values may generally quantify display quality degradation due to flicker noise.

The flicker index detection unit 644 detects a position change direction and luminance difference value of the horizontal lines that move in one direction by comparing the luminance values of the display images sequentially and successively detected by the photometer 607 with each other. The flicker index detection unit 644 may read the flicker index values corresponding to the luminance difference values for the horizontal lines that are sequentially input, from a separate memory, and may sequentially output or store the flicker index values. In some embodiments, the flicker index detection unit 644 may set the luminance difference values for the horizontal lines that are sequentially input as the flicker index values, and may sequentially output or store the flicker index values.

The data quantification unit 645 quantifies the magnitude of the occurrence of the flicker noise caused by the display control firmware and the touch driving firmware by matching the flicker index values to lists of the magnitude of the display driving frequency, the magnitude of the voltage values of the output signal, the magnitude of the touch driving frequency, and the magnitude of the voltage value of the touch driving signal.

For example, the data quantification unit 645 may sort the magnitude of the display driving frequency and the magnitude of the voltage value of the output signals sequentially changed in the display control firmware changing unit 642 into respective lists. The data quantification unit 645 may also sort the magnitude of the touch driving frequency and the magnitude of the voltage value of the touch driving signal sequentially changed in the touch driving firmware changing unit 643 into lists.

The data quantification unit 645 quantifies the flicker index values matched with the sorted lists of the magnitude of the display driving frequency, the voltage value of the output signals, the magnitude of the touch driving frequency, and the magnitude of the voltage value of the touch driving signals, respectively, by matching the flicker index values with the sorted lists. The sorted lists include lists of the magnitude of the display driving frequency, the voltage value of the output signals, the magnitude of the touch driving frequency, and the magnitude of the voltage value of the touch driving signals.

The firmware setting unit 646 changes or initializes the display control firmware and the touch driving firmware for each display device 10 by matching at least one customer requested firmware proposed by at least one manufacturer or customer companies to the display control firmware and the touch driving firmware quantified in the data quantification unit 645, and the quantified flicker index values.

For example, the firmware setting unit 646 may extract or check the lists of the magnitude of the display driving frequency, the voltage value of the output signals, the magnitude of the touch driving frequency, and the magnitude of the voltage value of the touch driving signals for matching values in at least one customer requested firmware proposed by at least one manufacturer or customer companies. In addition, the firmware setting unit 646 may match and compare the flicker index values for each of the magnitude of the display driving frequency, the voltage value of the output signals, the magnitude of the touch driving frequency, and the magnitude of the voltage value of the touch driving signals quantified by the data quantification unit 645 with the lists of the magnitude of the display driving frequency of the customer requested firmware, the voltage value of the output signals, the magnitude of the touch driving frequency, and the magnitude of the voltage value of the touch driving signals.

The firmware setting unit 646 may check the flicker index values according to the lists of the magnitude of the display driving frequency, the voltage value of the output signals, the magnitude of the touch driving frequency, and the magnitude of the voltage value of the touch driving signals of the customer requested firmware. In addition, the firmware setting unit 646 may either maintain or change the magnitude of the display driving frequency, the voltage value of the output signals, the magnitude of the touch driving frequency, and the voltage value of the touch driving signals from the customer requested firmware after checking the flicker index values according to the customer requested firmware. If the firmware setting unit 646 determines that changes should be made, the firmware setting unit 646 may then apply changes to the magnitude of the display driving frequency, the voltage value of the output signals, the magnitude of the touch driving frequency, the voltage value of the touch driving signals, or a combination thereof.

For example, when the flicker index values according to the customer requested firmware are lower than a reference value, the firmware setting unit 646 may maintain the customer requested firmware, but when the flicker index values are higher than the reference value, the firmware setting unit 646 may selectively change the magnitude of the display driving frequency, the voltage value of the output signals, the magnitude of the touch driving frequency, the magnitude of the voltage value of the touch driving signals, or a combination thereof, of the customer requested firmware.

The firmware setting unit 646 may check the flicker index values according to the lists of the magnitude of the display driving frequency, the voltage value of the output signals, the magnitude of the touch driving frequency, and the magnitude of the voltage value of the touch driving signals that are set in the display control firmware and the touch driving firmware for each display device 10. The firmware setting unit 646 may selectively maintain or change the magnitude of the display driving frequency, the voltage value of the output signals, the magnitude of the touch driving frequency, and the magnitude of the voltage value of the touch driving signals of the firmware for each display device 10.

Figure 11:
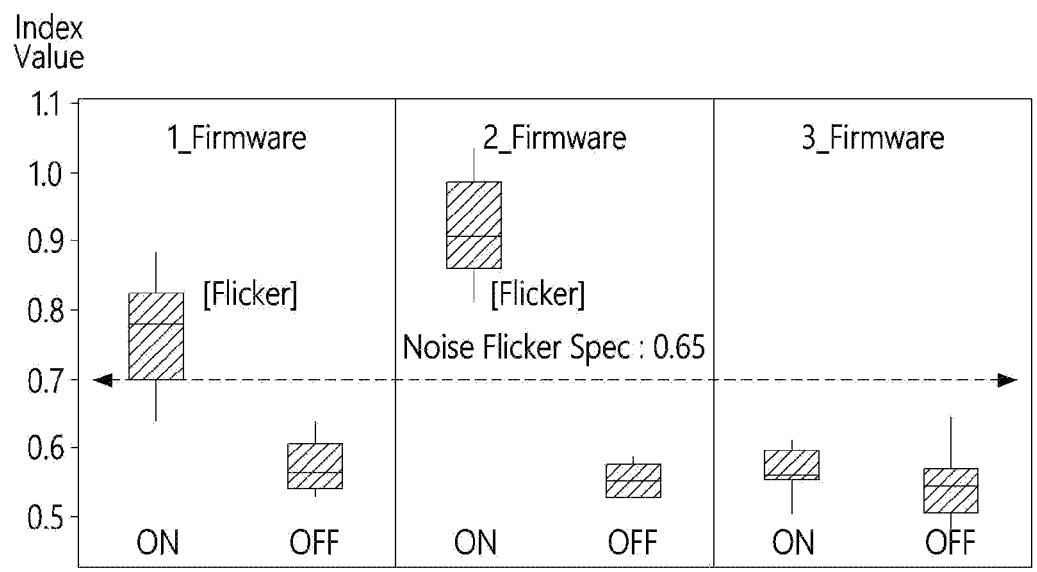
FIG. 11 illustrates a flicker index value detection result detected by applying different firmware.

FIG. 11 illustrates a flicker index value detection result detected by applying different firmware. In addition, Table 1 illustrates flicker index values detected by applying different firmware (1_Firmware through 3_Firmware).

TABLE 1

| | condition | | | | | |
|---|---|---|---|---|---|---|
| | 1_Firmware | | 2_Firmware | | 3_Firmware | |
| Touch | ON | OFF | ON | OFF | ON | OFF |
| 1 | 0.8852 | 0.5701 | 1.0332 | 0.5412 | 0.5526 | 0.5384 |
| 2 | 0.6873 | 0.5608 | 0.9186 | 0.5458 | 0.5985 | 0.5768 |
| 3 | 0.8377 | 0.5450 | 0.9794 | 0.5162 | 0.6140 | 0.5667 |
| 4 | 0.7026 | 0.6415 | 0.9813 | 0.5175 | 0.5579 | 0.5537 |
| 5 | 0.8220 | 0.5382 | 1.0220 | 0.5316 | 0.5908 | 0.4791 |
| 6 | 0.8085 | 0.5217 | 0.8997 | 0.5757 | 0.5647 | 0.5247 |
| 7 | 0.7245 | 0.5872 | 0.8727 | 0.5764 | 0.5544 | 0.6495 |
| 8 | 0.7894 | 0.6253 | 0.8079 | 0.5634 | 0.5527 | 0.5674 |
| 9 | 0.7728 | 0.6006 | 0.8364 | 0.5595 | 0.5033 | 0.5097 |
| 10 | 0.6378 | 0.5612 | 0.9046 | 0.5852 | 0.5973 | 0.5004 |
| Average | 0.7668 | 0.5752 | 0.9256 | 0.5513 | 0.5686 | 0.5466 |

Referring to Table 1 together with FIG. 11, the photometer 607 of the flicker noise detection device may sequentially detect the flicker index values from the respective display devices 10 in which the magnitude of the display driving frequency, the magnitude of the voltage values of the output signal, the magnitude of the touch driving frequency, and magnitude of the voltage value of the touch driving signal are differently set according to different firmware.

In an example, the flicker noise detection device supplies flicker detection pattern image data to the respective display device 10 driven by different firmware, and sequentially detect luminance difference values between the horizontal lines detected through the photometer 607. In addition, the flicker noise detection device may sequentially detect the flicker index values respectively corresponding to the luminance difference values.

The firmware setting unit 646 of the flicker noise detection device may change or initialize the display control firmware and the touch driving firmware for each display device 10 by matching the flicker index values according to the display control firmware and the touch driving firmware for each display device 10 with the quantified flicker index values. For example, the firmware setting unit 646 may reset the magnitude of the display driving frequency, the voltage value of the output signals, the magnitude of the touch driving frequency, and the magnitude of the voltage value of the touch driving signals that are set in the display control firmware and the touch driving firmware so that the flicker index values for each display device 10 are lower than a reference value (e.g., 0.65) or less.

Figure 12:
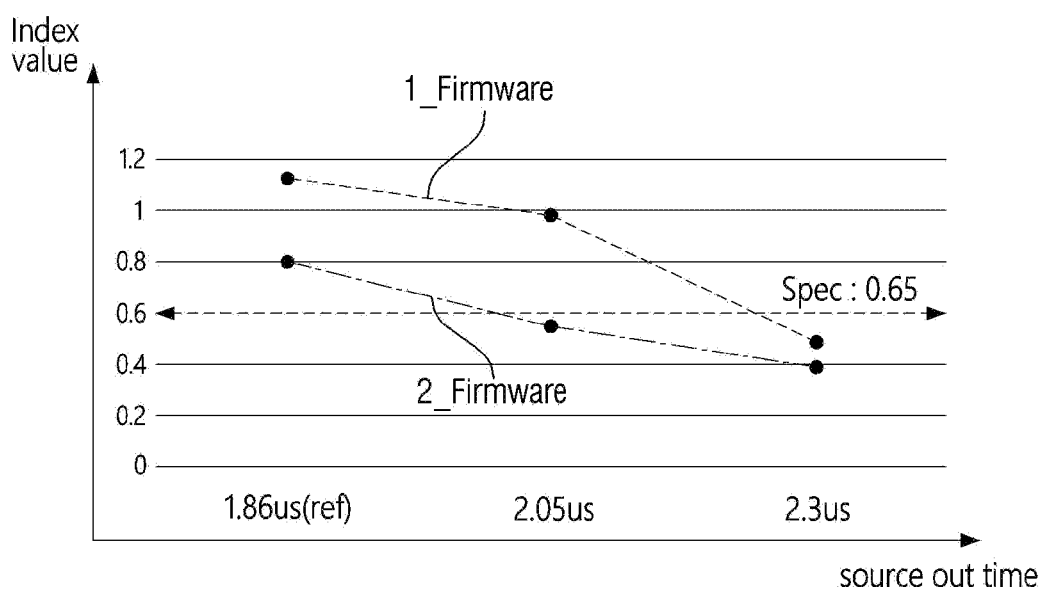
FIG. 12 is a graph that illustrates a flicker index value detection result detected by applying different image display driving firmware.

FIG. 12 is a graph that illustrates a flicker index value detection result detected by applying different image display driving firmware.

Referring to FIG. 12, the photometer 607 of the flicker noise detection device may sequentially detect the flicker index values from the respective display devices 10 in which an image display speed, e.g., a speed at which the data voltage is sequentially supplied to the data line DL is differently set according to different display control firmware.

For example, the flicker noise detection device may supply flicker detection pattern image data to the respective display device 10 driven by the display control firmware in which the image display speed is differently set, and sequentially detect luminance difference values between the horizontal lines detected through the photometer 607. In addition, the flicker noise detection device may sequentially detect the flicker index values respectively corresponding to the luminance difference values.

As illustrated in FIG. 12, an average flicker index value for each display device 10 may be differently detected according to speeds (1.86 μs, 2.05 μs, and 2.3 μs) at which the data voltage is sequentially supplied to the data line DL.

Accordingly, the firmware setting unit 646 of the flicker noise detection device may change or initialize the display control firmware for each display device 10 by matching the flicker index values according to the display control firmware for each display device 10 with the quantified flicker index values. For example, the firmware setting unit 646 may reset the image display speed of the display control firmware so that the flicker index values for each display device 10 are lowered to the reference value (e.g., 0.65) or less.

Figure 13:
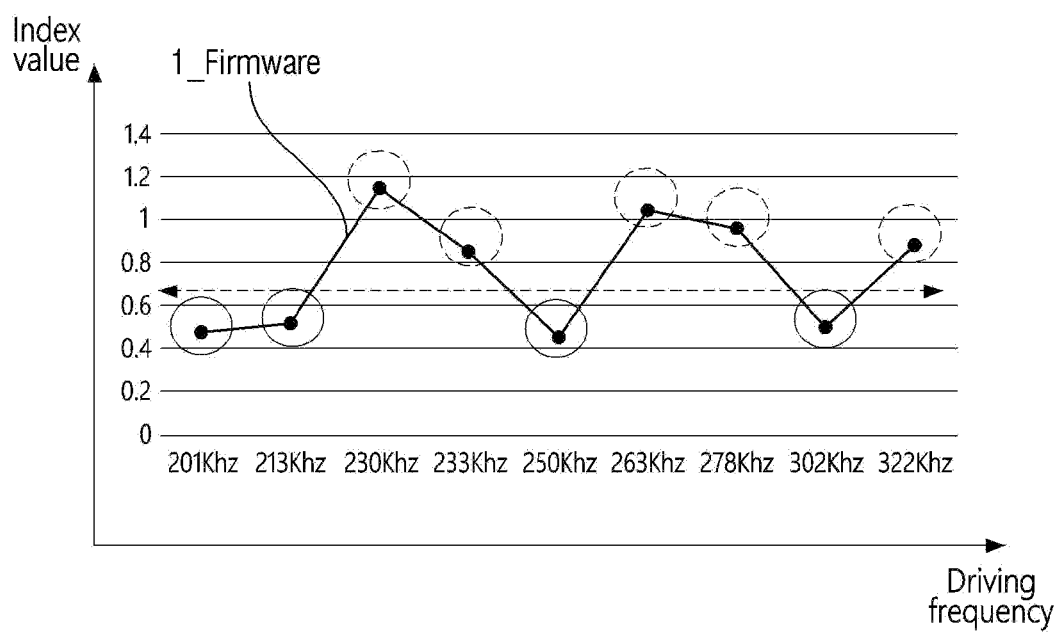
FIG. 13 illustrates a flicker index value detection result detected by applying different touch driving firmware.

FIG. 13 illustrates a flicker index value detection result detected by applying different touch driving firmware.

Referring to FIG. 13, the photometer 607 of the flicker noise detection device may sequentially detect the flicker index values from the respective display devices 10 in which display driving frequencies (201 kHz to 322 kHz) are differently set according to different display control firmware.

For example, the flicker noise detection device may supply flicker detection pattern image data to the respective display devices 10 driven by the display control firmware in which the display driving frequency is differently set, and sequentially detect luminance difference values between the horizontal lines detected through the photometer 607. In addition, the flicker noise detection device may sequentially detect the flicker index values respectively corresponding to the luminance difference values.

As illustrated in FIG. 13, different average flicker index values for each display device may be detected according to the display driving frequency (201 kHz to 322 kHz) of the display panel 100.

Accordingly, the firmware setting unit 646 of the flicker noise detection device may change or initialize the display control firmware for each display device 10 by matching the flicker index values according to the display control firmware for each display device 10 with the quantified flicker index values. For example, the firmware setting unit 646 may reset the display driving frequency (201 kHz to 322 kHz) of the display control firmware so that the flicker index values for each display device 10 are lowered to the reference value (e.g., 0.65) or less.

Figure 14:
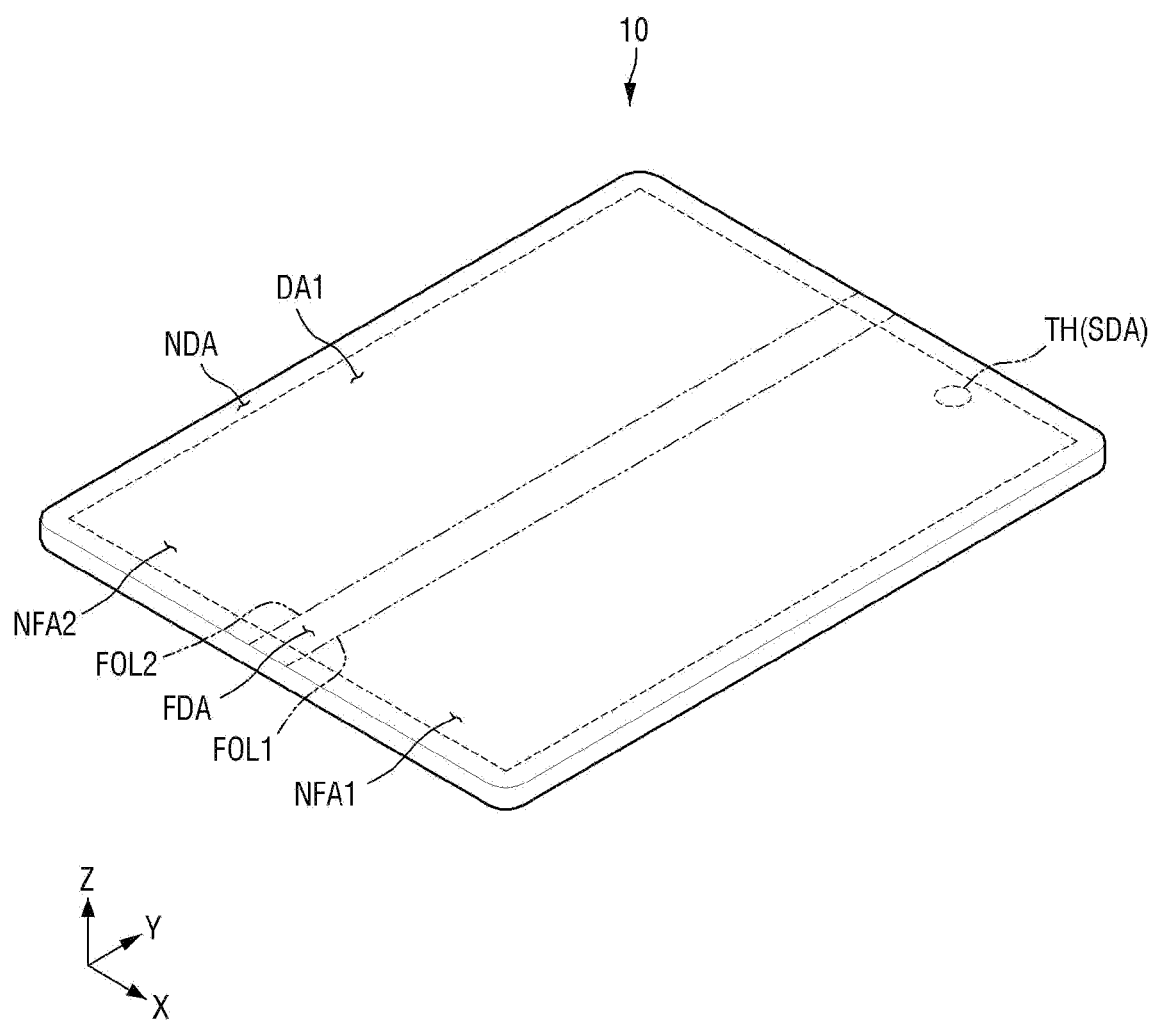
FIGS. 14 and 15 are perspective views of a display device according to another embodiment of the present disclosure.
Figure 15:
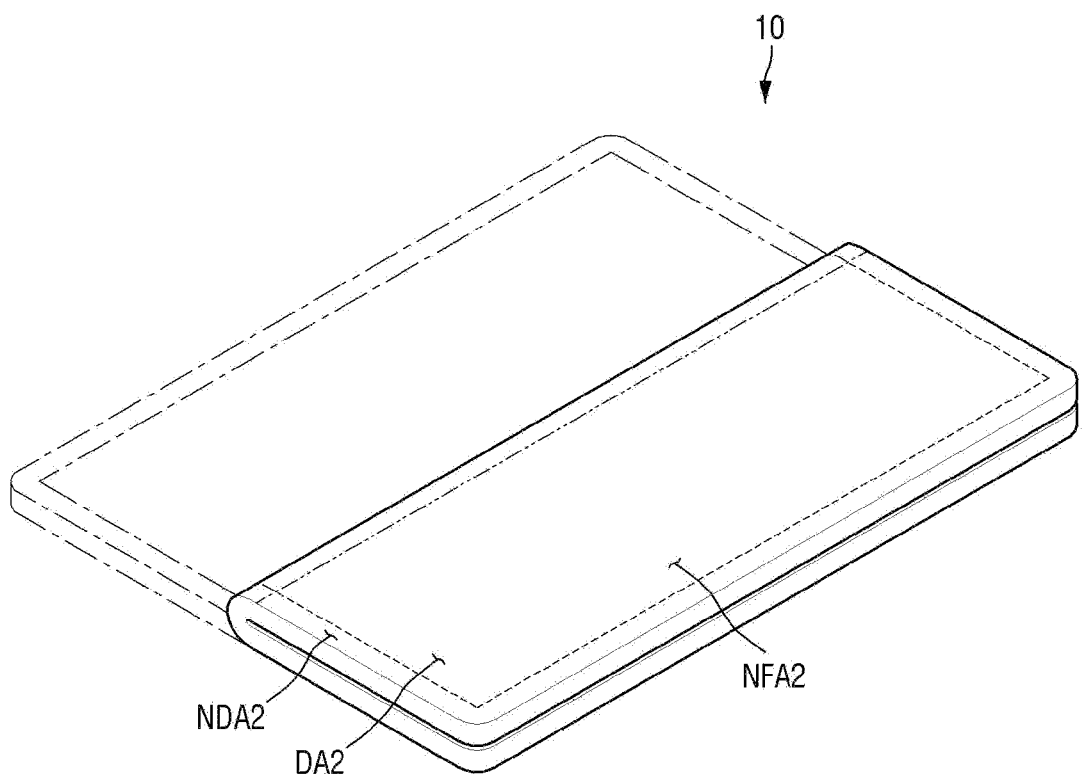

FIGS. 14 and 15 are perspective views of a display device according to another embodiment of the present disclosure.

FIGS. 14 and 15 illustrate an embodiment of the display device 10 as a foldable display device that can be folded in the first direction (e.g., X-axis direction) in an operable configuration. The display device 10 may maintain both a folded state and an unfolded state. The display device may be folded in an in-folding manner in which a front surface thereof is disposed on an inner side. When the display device 10 is bent or folded in the in-folding manner, the front surfaces of the display device 10 may face each other. Alternatively, the display device 10 may be folded in an out-folding manner in which the front surface thereof is disposed on an outer side. When the display device 10 is bent or folded in the out-folding manner, rear surfaces of the display device may face each other.

A first non-folding area NFA1 may be disposed on one side, for example, a right side of a folding area FDA. A second non-folding area NFA2 may be disposed on the other side, for example, a left side of the folding area FDA. The touch sensing unit TSU according to the embodiment of the present specification may be formed and disposed on the first non-folding area NFA1 and the second non-folding area NFA2.

A first folding line FOL1 and a second folding line FOL2 may extend in the second direction (e.g., Y-axis direction), and the display device 10 may be folded in the first direction (e.g., X-axis direction). Accordingly, since a length of the display device 10 in the first direction (e.g., X-axis direction) may be reduced by about half in the folded state, the display device 10 may offer increased portability to a user.

The extending direction of the first folding line FOL1 and the extending direction of the second folding line FOL2 are not necessarily limited to the second direction (e.g., Y-axis direction), however. For example, the first folding line FOL1 and the second folding line FOL2 may extend in the first direction (e.g., X-axis direction), and the display device 10 may be folded in the second direction (e.g., Y-axis direction). In this case, a length of the display device 10 in the second direction (the Y-axis direction) may be reduced by about half. In some embodiments, the first folding line FOL1 and the second folding line FOL2 may extend in a diagonal direction between the first direction (e.g., X-axis direction) and the second direction (e.g., Y-axis direction) of the display device 10. In this case, the display device 10 may be folded in a triangular shape.

When the first folding line FOL1 and the second folding line FOL2 extend in the second direction (e.g., Y-axis direction), a length of the folding area FDA in the first direction (e.g., X-axis direction) may be shorter than a length thereof in the second direction (e.g., Y-axis direction). In addition, a length of the first non-folding area NFA1 in the first direction (e.g., X-axis direction) may be longer than the length of the folding area FDA in the first direction (e.g., X-axis direction). A length of the second non-folding area NFA2 in the first direction (e.g., X-axis direction) may be longer than the length of the folding area FDA in the first direction (e.g., X-axis direction).

A first display area DA1 may be disposed on the front surface of the display device 10. The first display area DA1 may overlap the folding area FDA, the first non-folding area NFA1, and the second non-folding area NFA2. Therefore, when the display device 10 is unfolded, an image may be displayed in a front direction (e.g., outwardly towards a user) in the folding area FDA, the first non-folding area NFA1, and the second non-folding area NFA2 of the display device 10.

A second display area DA2 may be disposed on the rear surface of the display device 10. The second display area DA2 may overlap the second non-folding area NFA2. When the display device 10 is folded, an image may be displayed in the front direction in the second non-folding area NFA2 of the display device 10.

FIGS. 14 and 15 illustrate an embodiment that includes a through hole TH in which a camera SDA is formed is disposed in the first non-folding area NFA1, but the present disclosure is not necessarily limited thereto. The through hole TH or the camera SDA may be disposed in the second non-folding area NFA2 or the folding area FDA.

Figure 16:
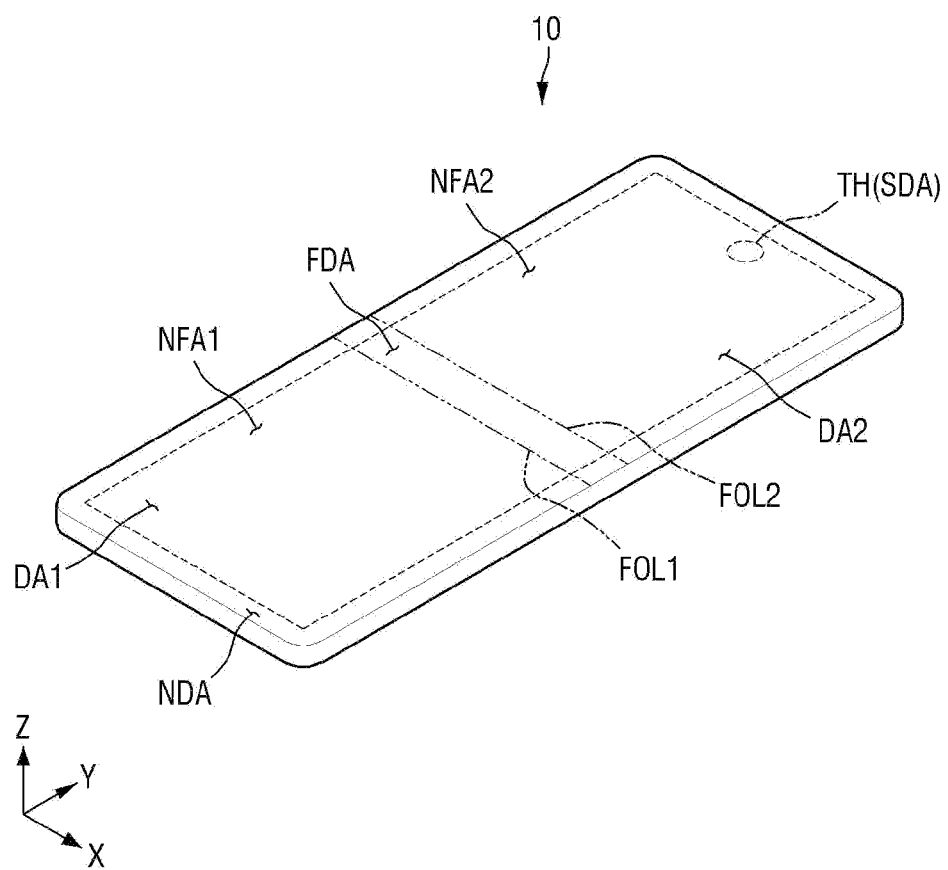
FIGS. 16 and 17 are perspective views of a display device according to still another embodiment of the present disclosure.
Figure 17:
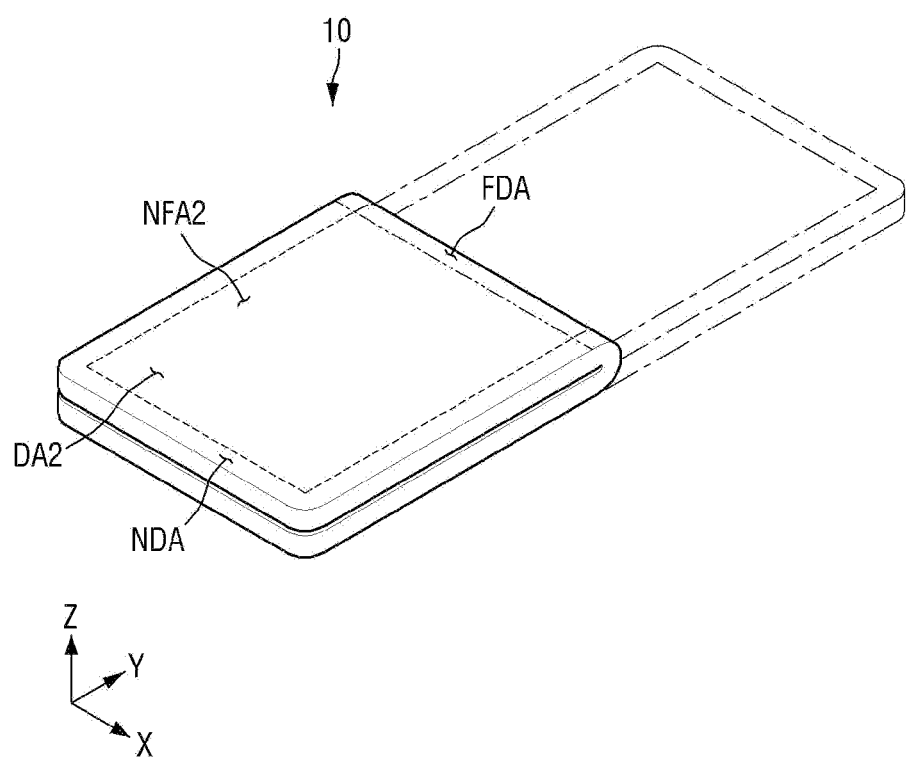

FIGS. 16 and 17 are perspective views of a display device according to still another embodiment of the present disclosure. FIGS. 16 and 17 illustrate an embodiment of the display device 10 such that the display device 10 is a foldable display device that is folded in the second direction (e.g., Y-axis direction). The display device 10 may maintain a folded state or an unfolded state during operation. The display device 10 may be folded in an in-folding manner in which a front surface thereof is disposed on an inner side. When the display device 10 is bent or folded in the in-folding manner, the front surfaces of the display device 10 may be disposed to face each other. Alternatively, the display device 10 may be folded in an out-folding manner in which the front surface thereof is disposed on an outer side. When the display device 10 is bent or folded in the out-folding manner, rear surfaces of the display device 10 may be disposed to face each other.

The display device 10 may include a folding area FDA, a first non-folding area NFA1, and a second non-folding area NFA2. The folding area FDA may be an area in which the display device 10 is folded, and the first non-folding area NFA1 and the second non-folding area NFA2 may be areas in which the display device 10 is not folded. For example, the folding area FDA may include a surface that has a nonzero curvature when the display device 10 is in the folded state. The first non-folding area NFA1 may be disposed on one side, for example, a lower side of the folding area FDA. The second non-folding area NFA2 may be disposed on the other side, for example, an upper side of the folding area FDA.

The touch sensing unit TSU according to the embodiment of the present specification may be formed and disposed on the first non-folding area NFA1 and the second non-folding area NFA2.

The folding area FDA may be an area that is bent with a predetermined curvature at the first folding line FOL1 and the second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

As illustrated in FIGS. 16 and 17, the first folding line FOL1 and the second folding line FOL2 may extend in the first direction (e.g., X-axis direction), and the display device 10 may be folded in the second direction (e.g., Y-axis direction). Accordingly, since a length of the display device 10 in the second direction (e.g., Y-axis direction) may be reduced by about half, the display device 10 according to the present embodiment may provide increased portability for a user.

The extending direction of the first folding line FOL1 and the extending direction of the second folding line FOL2 are not necessarily limited to the first direction (e.g., X-axis direction). For example, the first folding line FOL1 and the second folding line FOL2 may extend in the second direction (e.g., Y-axis direction), and the display device 10 may be folded in the first direction (e.g., X-axis direction). In this case, a length of the display device 10 in the first direction (the X-axis direction) may be reduced by about half. Alternatively, the first folding line FOL1 and the second folding line FOL2 may extend in a diagonal direction between the first direction (e.g., X-axis direction) and the second direction (e.g., Y-axis direction) of the display device 10. In this case, the display device 10 may be folded in a triangular shape.

When the first folding line FOL1 and the second folding line FOL2 extend in the first direction (e.g., X-axis direction) as illustrated in FIGS. 16 and 17, a length of the folding area FDA in the second direction (e.g., Y-axis direction) may be shorter than a length thereof in the first direction (e.g., X-axis direction). In addition, a length of the first non-folding area NFA1 in the second direction (e.g., Y-axis direction) may be longer than the length of the folding area FDA in the second direction (e.g., Y-axis direction). In addition, a length of the second non-folding area NFA2 in the second direction (e.g., Y-axis direction) may be longer than the length of the folding area FDA in the second direction (e.g., Y-axis direction).

A first display area DA1 may be disposed on the front surface of the display device 10. The first display area DA1 may overlap the folding area FDA, the first non-folding area NFA1, and the second non-folding area NFA2. Therefore, when the display device 10 is unfolded, an image may be displayed in a front direction (e.g., a user facing direction) in the folding area FDA, the first non-folding area NFA1, and the second non-folding area NFA2 of the display device 10.

A second display area DA2 may be disposed on the rear surface of the display device 10. The second display area DA2 may overlap the second non-folding area NFA2. Therefore, when the display device 10 is folded, an image may be displayed in the front direction in the second non-folding area NFA2 of the display device 10.

FIGS. 16 and 17 illustrate that a through hole TH in which a camera SDA is disposed is disposed in the second non-folding area NFA2, but the present disclosure is not necessarily limited thereto. The through hole TH may be disposed in the first non-folding area NFA1 or the folding area FDA.

A display device according to embodiments of the present disclosure may be adjusted using the systems and methods described herein to have reduced flicker noise and increased image quality. For example, one or more parameters included in the firmware of the display device, such as a display driving frequency and a touch driving frequency, may be compared with the same or similar parameters in another firmware, and adjusted to ensure that a flicker index value is below a threshold value. In some embodiments, a flicker noise detection device is used to mount the display device, measure and record data corresponding to an image on the display device, and adjust the firmware of the display device.

In concluding the detailed description, those skilled in the art will appreciate that many variations and modifications can be made to the embodiments without substantially departing from the principles of the present inventive concept. Therefore, the disclosed embodiments of the inventive concept are used in a generic and descriptive sense only and not for purposes of limitation.

What is claimed is:

1. A display device comprising:
   a display panel including a display area including a plurality of pixels;
   a touch sensing unit disposed on a front surface of the display panel;
   a display driving circuit, configured to drive the pixels of the display area based on display control firmware; and
   a touch driving circuit configured to drive touch electrodes of the touch sensing unit based on touch driving firmware, and further configured to generate touch coordinate data,
   wherein the display control firmware and the touch driving firmware are initialized or changed according to a comparison result between a flicker noise detection value of the display area and a reference flicker noise detection value, wherein the flicker noise detection value is determined by measuring a change in luminance, of the plurality of pixels, over time with a flicker detection pattern displayed in the display area.

2. The display device of claim 1, wherein the display driving circuit generates data voltages according to a display driving frequency set in the display control firmware and supplies the data voltages to data lines of the display area, and further supplies an output signal a gate line, wherein the output signal has a voltage magnitude corresponding to a voltage value of output signals set in the display control firmware.

3. The display device of claim 2, wherein the touch driving circuit generates touch driving signals with a voltage magnitude corresponding to a voltage value set in the touch driving firmware, and supplies the touch driving signals to the touch electrodes of the touch sensing unit according to a touch driving frequency set in the touch driving firmware.

4. The display device of claim 3, wherein the touch driving circuit groups the touch electrodes into a preset number of groups according to programming of the touch driving firmware, and supplies the touch driving signals to the touch electrodes for each group according to the touch driving frequency.

5. An electronic device comprising:
   a display panel including a display area including a plurality of pixels;
   a touch sensing unit disposed on a front surface of the display panel;
   a display driving circuit, configured to drive the pixels of the display area based on display control firmware; and
   a touch driving circuit configured to drive touch electrodes of the touch sensing unit based on touch driving firmware, and further configured to generate touch coordinate data,
   wherein the display control firmware and the touch driving firmware are initialized or changed according to a comparison result between a flicker noise detection value of the display area and a reference flicker noise detection value, wherein the flicker noise detection value is determined by measuring a change in luminance over time of a flicker detection pattern displayed in the display area, and
   wherein the flicker noise detection value is computed from a luminance difference value measured through a photometer, wherein the luminance difference value is measured over time while gradually changing a display driving frequency and voltage values of output signals of the display control firmware and gradually changing a touch driving frequency and voltage values of a touch driving signal of the touch driving firmware through a flicker noise detection device.

6. The electronic device of claim 5, wherein the flicker noise detection value is a luminance difference value measured by the photometer, wherein the photometer measures the flicker detection pattern during a measurement period, the measurement period including the steps of:

gradually increasing, decreasing, or changing a magnitude of the display driving frequency in units of one or more frame periods within a preset range, gradually increasing, decreasing, or changing the voltage values of the output signal in units of one or more frame periods, and sequentially writing the changes in display driving frequency and voltage values of the output signal to the display driving circuit.

7. The electronic device of claim 6, wherein the flicker noise detection value is computed from a luminance difference value measured by the photometer while simultaneously changing the magnitude of the display driving frequency and the voltage values of the output signal during a same time, or while alternately changing the magnitude of the display driving frequency and the voltage values of the output signal at different times.

8. The electronic device of claim 5, wherein the flicker noise detection value is a luminance difference value measured by the photometer, wherein the photometer measures the flicker detection pattern during a measurement period, the measurement period including the steps of:

gradually increasing, decreasing, or changing a magnitude of the touch driving frequency set in the touch driving firmware in units of one or more frame periods within a preset range, gradually increasing, decreasing, or changing the voltage values of the touch driving signal set in the touch driving firmware in units of one or more frame periods, and sequentially writing changes in touch driving frequency and voltage values of the touch driving signal to the touch driving circuit.

9. The electronic device of claim 8, wherein the flicker noise detection value is computed from a luminance difference value measured by the photometer while simultaneously changing the magnitude of the touch driving frequency and the voltage value of the touch driving signals during a same time, or while alternately changing the magnitude of the touch driving frequency and the voltage value of the touch driving signals at different times.

10. The electronic device of claim 5, wherein the display control firmware and the touch driving firmware include preset values for a magnitude of the display driving frequency, a voltage value of the output signals, a magnitude of the touch driving frequency, and a magnitude of a voltage value of the touch driving signals, and wherein the values are either maintained or changed according to a comparison result that measures a difference between the computed flicker noise detection value and the reference flicker noise detection value.

11. A method of setting driving firmware of a display device, the method comprising:

driving pixels included in a display panel with a display driving circuit, wherein the pixels are driven based on display control firmware;

driving touch electrodes of a touch sensing unit with a touch driving circuit, wherein the touch electrodes are driven based on touch driving firmware and generating touch coordinate data;

detecting flicker noise of an image displayed on the display panel using a flicker noise detection device that measures luminance of the driven pixels; and changing the display control firmware and the touch driving firmware according to a comparison result between a flicker noise detection value detected by the flicker noise detection device and a pre-quantified flicker noise detection value.

12. The method of claim 11, wherein, in the driving of the pixels included in the display panel, the display driving circuit generates data voltages according to a display driving frequency value included in the display control firmware and supplies the data voltages to data lines of the display area, and supplies an output signal having a voltage magnitude corresponding to a voltage value of output signals included in the display control firmware to a gate line.

13. The method of claim 12, wherein the driving of the touch electrodes of the touch sensing unit includes:

generating, by the touch driving circuit, touch driving signals with a voltage magnitude corresponding to a voltage value of a touch driving signal included in the touch driving firmware; and supplying the touch driving signals to the touch electrodes of the touch sensing unit according to a touch driving frequency value included in the touch driving firmware.

14. The method of claim 11, wherein the detecting of the flicker noise of the image displayed on the display panel includes:

gradually changing a touch driving frequency value and voltage values of output signals of the display control firmware through the flicker noise detection device;

gradually changing a touch driving frequency value and voltage values of a touch driving signal of the touch driving firmware;

measuring a luminance difference value corresponding to the flicker noise through a photometer; and outputting the luminance difference value as the flicker noise detection value.

15. The method of claim 14, wherein the gradually changing of the display driving frequency value and the voltage values of the output signals includes:

gradually increasing, decreasing, or changing a magnitude of the display driving frequency value included in the display control firmware in units of one or more frame periods within a preset range;

gradually increasing, decreasing, or changing the voltage values of the output signal included in the display control firmware in units of one or more frame periods; and sequentially writing the changed display driving frequency value and the changed voltage values of the output signals to the display driving circuit.

16. The method of claim 14, wherein, in the gradually changing of the display driving frequency value and the voltage values of the output signals, the display control firmware is sequentially written to the display driving circuit while simultaneously changing the magnitude of the display driving frequency value and the voltage values of the output signal during a same time, or alternately changing the magnitude of the display driving frequency value and the voltage values of the output signal at different times.

17. The method of claim 14, wherein the gradually changing of the touch driving frequency value and the voltage values of the touch driving signal of the touch driving firmware, includes:

gradually increasing, decreasing, or changing a magnitude of the touch driving frequency value included in the touch driving firmware in units of one or more frame periods within a preset range, gradually increasing, decreasing, or changing the voltage values of the touch driving signal included in the touch driving firmware in units of one or more frame periods, and sequentially writing the changed touch driving frequency value and the changed voltage values of the tough driving signal to the touch driving circuit.

18. The method of claim 17, wherein, in the gradually changing of the touch driving frequency and the voltage values of the touch driving signal of the touch driving firmware, the touch driving firmware is sequentially written to the touch driving circuit while simultaneously changing the magnitude of the touch driving frequency and the voltage value of the touch driving signals during a same time, or alternately changing the magnitude of the touch driving frequency and the voltage value of the touch driving signals at different times.

19. The method of claim 14, wherein, in the changing of the display control firmware and the touch driving firmware, preset values for a magnitude of the display driving frequency, a voltage value of the output signals, a magnitude of the touch driving frequency, and a magnitude of a voltage value of the touch driving signals are either changed or maintained according to a comparison result that measures a difference between the flicker noise detection value driven and detected by the display control firmware and the touch driving firmware with the quantified flicker noise detection value.

20. The method of claim 14, wherein the detecting of the flicker noise of the image disposed on the display panel includes:
 sequentially storing a luminance value of a display image detected through a photometer, and detecting luminance difference values between horizontal lines that move in one direction over a time interval; and
 sequentially outputting flicker index values over the time interval, the flicker index values respectively corresponding to the luminance difference values, and
 wherein the flicker index values are read from a memory as flicker index values corresponding to the luminance difference value, or the luminance difference value is set as the flicker index value.

* * * * *